(12) United States Patent
Zhang et al.

(10) Patent No.: US 10,787,259 B2
(45) Date of Patent: Sep. 29, 2020

(54) COMPLIANT BISTABLE GRIPPER FOR AERIAL PERCHING AND GRASPING

(71) Applicant: COLORADO STATE UNIVERSITY RESEARCH FOUNDATION, Fort Collins, CO (US)

(72) Inventors: Haijie Zhang, Fort Collins, CO (US); Jianguo Zhao, Fort Collins, CO (US); Jiefeng Sun, Fort Collins, CO (US)

(73) Assignee: COLORADO STATE UNIVERSITY RESEARCH FOUNDATION, Fort Collins, CO (US)

( * ) Notice: Subject to any disclaimer, the term of this patent is extended or adjusted under 35 U.S.C. 154(b) by 0 days.

(21) Appl. No.: 16/678,457

(22) Filed: Nov. 8, 2019

(65) Prior Publication Data
US 2020/0148360 A1   May 14, 2020

Related U.S. Application Data

(60) Provisional application No. 62/757,508, filed on Nov. 8, 2018.

(51) Int. Cl.
*B25J 15/08* (2006.01)
*B25J 15/10* (2006.01)
(Continued)

(52) U.S. Cl.
CPC .............. *B64D 1/22* (2013.01); *B64C 39/024* (2013.01); *B64C 2201/027* (2013.01); *B64C 2201/128* (2013.01)

(58) Field of Classification Search
CPC ... B64D 1/22; B64C 39/024; B64C 2201/128; B64C 2201/027; B25J 15/08; B25J 15/10; B25J 15/00061; B66C 1/54
(Continued)

(56) References Cited

U.S. PATENT DOCUMENTS 4,955,918 A * 9/1990 Lee .................... A61F 2/583
294/111
5,052,736 A * 10/1991 Loncaric ............. B25J 15/103
294/106
(Continued)

OTHER PUBLICATIONS

D. Floreano and R. J. Wood, "Science, technology and the future of small autonomous drones," Nature, vol. 521, No. 7553, p. 460, 2015.
(Continued)

*Primary Examiner* — Paul T Chin
(74) *Attorney, Agent, or Firm* — Meunier Carlin & Curfman LLC

(57) ABSTRACT

A bistable gripper for an aerial vehicle may include a base, a first finger, a second finger, a switching pad, a first elastic connector, and a second elastic connector. The base may include a first beam and a second beam. The first finger may be pivotably attached to the first beam at a first joint, and the second finger may be pivotably attached to the second beam at a second joint. The switching pad may be configured for moving relative to the base. The first elastic connector may be attached to the switching pad and the first finger, and the second elastic connector may be attached to the switching pad and the second finger. The bistable gripper may be configured for switching between a closed stable state and an open stable state.

20 Claims, 16 Drawing Sheets

(51) Int. Cl.
*B64D 1/22* (2006.01)
*B64C 39/02* (2006.01)

(58) Field of Classification Search
USPC .................................................. 294/106, 198
See application file for complete search history.

(56) References Cited

U.S. PATENT DOCUMENTS

| | | | | |
|---|---|---|---|---|
| 5,108,140 A * | 4/1992 | Bartholet | ............. | B25J 15/0009 |
| | | | | 294/106 |
| 5,711,565 A * | 1/1998 | Smith | ..................... | B65F 3/041 |
| | | | | 294/198 |
| 5,863,086 A * | 1/1999 | Christenson | .............. | B65F 3/04 |
| | | | | 294/106 |
| 7,370,896 B2 * | 5/2008 | Anderson | ............ | B25J 15/0009 |
| | | | | 294/106 |
| 7,556,299 B2 * | 7/2009 | Koyama | .............. | B25J 15/0009 |
| | | | | 294/106 |
| 7,850,218 B2 * | 12/2010 | Delescluse | ................ | B66C 1/66 |
| | | | | 294/115 |
| 9,016,742 B2 * | 4/2015 | Nammoto | ............. | B25J 13/082 |
| | | | | 294/106 |
| 2009/0285664 A1 * | 11/2009 | Kim | ...................... | B25J 9/1612 |
| | | | | 414/730 |
| 2014/0103673 A1 * | 4/2014 | Nammoto | ............. | B25J 13/082 |
| | | | | 294/106 |

OTHER PUBLICATIONS

W. R. Roderick, M. R. Cutkosky, and D. Lentink, "Touchdown to take-off: at the interface of flight and surface locomotion," Interface focus, vol. 7, No. 1, p. 20160094, 2017.
Zhang, Haijie, and Jianguo Zhao. "Vision based surface slope estimation for unmanned aerial vehicle perching." ASME 2018 Dynamic Systems and Control Conference. American Society of Mechanical Engineers Digital Collection, 2018.
Zhang, H. et al., "Optimal trajectory generation for time-to-contact based aerial robotic perching," Bioinspiration & Biomimetics, vol. 14, No. 1, p. 016008, 2018.
M. Graule, P. Chirarattananon, S. Fuller, N. Jafferis, K. Ma, M. Spenko, R. Kornbluh, and R. Wood, "Perching and takeoff of a robotic insect on overhangs using switchable electrostatic adhesion," Science, vol. 352, No. 6288, pp. 978-982, 2016.
M. Kovăc, J. Germann, C. H urzeler, R. Y. Siegwart, and D. Floreano, "A perching mechanism for micro aerial vehicles," Journal of Micro-Nano Mechatronics, vol. 5, No. 3-4, pp. 77-91, 2009.
D. Mehanovic, J. Bass, T. Courteau, D. Rancourt, and A. L. Desbiens, "Autonomous thrust-assisted perching of a fixed-wing uav on vertical surfaces," in Conference on Biomimetic and Biohybrid Systems, pp. 302-314, Springer, 2017.
J. Thomas, M. Pope, G. Loianno, E. W. Hawkes, M. A. Estrada, H. Jiang, M. R. Cutkosky, and V. Kumar, "Aggressive flight with quadrotors for perching on inclined surfaces," Journal of Mechanisms and Robotics, vol. 8, No. 5, p. 051007, 2016.
M. T. Pope, C. W. Kimes, H. Jiang, E. W. Hawkes, M. A. Estrada, C. F. Kerst, W. R. Roderick, A. K. Han, D. L. Christensen, and M. R. Cutkosky, "A multimodal robot for perching and climbing on vertical outdoor surfaces," IEEE Transactions on Robotics, vol. 33, No. 1, pp. 38-48, 2017.
C. E. Doyle, J. J. Bird, T. A. Isom, J. C. Kallman, D. F. Bareiss, D. J. Dunlop, R. J. King, J. J. Abbott, and M. A. Minor, "An avian-inspired passive mechanism for quadrotor perching," IEEE/ASME Transactions on Mechatronics, vol. 18, No. 2, pp. 506-517, 2013.
T. Schioler and S. Pellegrino, "Space frames with multiple stable configurations," AIAA journal, vol. 45, No. 7, pp. 1740-1747, 2007.
T.-A. Nguyen and D.-A. Wang, "A gripper based on a compliant bitable mechanism for gripping and active release of objects," in Manipulation, Automation and Robotics at Small Scales (MARSS), International Conference on, pp. 1-4, IEEE, 2016.
T. Chen, J. Mueller, and K. Shea, "Integrated design and simulation of tunable, multi-state structures fabricated monolithically with multimaterial 3d printing," Scientific reports, vol. 7, p. 45671, 2017.
T. Chen, O. R. Bilal, K. Shea, and C. Daraio, "Harnessing bistability for directional propulsion of soft, untethered robots," Proceedings of the National Academy of Sciences, p. 201800386, 2018.
A. Alqasimi, C. Lusk, and J. Chimento, "Design of a linear bistable compliant crank-slider mechanism," Journal of Mechanisms and Robotics, vol. 8, No. 5, p. 051009, 2016.
G. Li and G. Chen, "A function for characterizing complete kinetostatic behaviors of compliant bistable mechanisms," Mechanical Sciences, vol. 5, No. 2, pp. 67-78, 2014.
J. Qiu, J. H. Lang, and A. H. Slocum, "A curved-beam bistable mechanism," Journal of microelectromechanical systems, vol. 13, No. 2, pp. 137-146, 2004.
N. Hu and R. Burgue~no, "Buckling-induced smart applications: recent advances and trends," Smart Materials and Structures, vol. 24, No. 6, p. 063001, 2015.
P. Kelly, "An introduction to solid mechanics," Lecture notes, pp. 229-270, 2013.
Crutsinger, G. M. et al., "The future of UAVs in ecology: an insider perspective from the Silicon Valley drone industry," Journal of Unmanned Vehicle Systems, vol. 4, No. 3, pp. 161-168, 2016.
Liu, P. et al., "Flies land upside down on a ceiling using rapid visually-mediated rotational maneuvers," Science Advances, vol. 5, No. 10, p. eaax1877, 2019.
Kovac, M., "Learning from nature how to land aerial robots," Science, vol. 352, No. 6288, pp. 895-896, 2016.
Anderson, M., "The sticky-pad plane and other innovative concepts for perching UAVs," in 47th AIAA Aerospace Sciences Meeting Including the New Horizons Forum and Aerospace Exposition, p. 40, 2009.
Daler, L. et al., "A perching mechanism for flying robots using a fibre-based adhesive," in 2013 IEEE International Conference on Robotics and Automation, pp. 4433-4438, May 2013.
Zhang, K. et al., "SpiderMAV: Perching and stabilizing micro aerial vehicles with bioinspired tensile anchoring systems," in 2017 IEEE/RSJ International Conference on Intelligent Robots and Systems (IROS), pp. 6849-6854, Sep. 2017.
Nguyen, H. et al., "A passively adaptive microspine grapple for robust, controllable perching," in 2019 2nd IEEE International Conference on Soft Robotics (RoboSoft), pp. 80-87, Apr. 2019.
Hang, K. et al., "Perching and resting paradigm for UAV maneuvering with modularized landing gears," Science Robotics, vol. 4, No. 28, p. eaau6637, 2019.
Thuruthel, T. G. et al., "A bistable soft gripper with mechanically embedded sensing and actuation for fast closed-loop grasping," arXiv preprint arXiv:1902.04896, 2019.
Noh, M. et al., "Fleainspired catapult mechanism for miniature jumping robots," IEEE Transactions on Robotics, vol. 28, No. 5, pp. 1007-1018, 2012.
Koh, J.-S. et al., "Jumping on water: Surface-tension dominated jumping of water striders and robotic insects," Science, vol. 349, No. 6247, pp. 517-521, 2015.
Faber, J. A. et al., "Bioinspired spring origami," Science, vol. 359, No. 6382, pp. 1386-1391, 2018.
Mintchev, S. et al., "Bioinspired dual-stiffness origami," Science Robotics, vol. 3, No. 20, p. eaau0275, 2018.
Rothemund, P. et al., "A soft, bistable valve for autonomous control of soft actuators," Science Robotics, vol. 3, No. 16, p. eaar7986, 2018.
Silverberg, J. L. et al., "Origami structures with a critical transition to bistability arising from hidden degrees of freedom," Nature Materials, vol. 14, No. 4, p. 389, 2015.
Haghpanah, B. et al., "Multistable shape-reconfigurable architected materials," Advanced Materials, vol. 28, No. 36, pp. 7915-7920, 2016.

(56) References Cited

OTHER PUBLICATIONS

DeMario, A. et al., "Development and analysis of a three-dimensional printed miniature walking robot with soft joints and links," Journal of Mechanisms and Robotics, vol. 10, 04, 2018.

* cited by examiner

COMPLIANT BISTABLE GRIPPER FOR AERIAL PERCHING AND GRASPING

CROSS-REFERENCE TO RELATED APPLICATION

This application claims the benefit of, and priority to, U.S. Provisional Patent Application No. 62/757,508, filed on Nov. 8, 2018, and titled "Compliant Bistable Gripper for Aerial Perching and Grasping," the disclosure of which is expressly incorporated herein by reference in its entirety.

GOVERNMENT SUPPORT CLAUSE

This invention was made with government support under grant 1815476 awarded by the National Science Foundation. The government has certain rights in the invention.

FIELD OF THE DISCLOSURE

The present disclosure relates generally to aerial vehicles and more particularly to a compliant bistable gripper for an aerial vehicle to facilitate aerial perching and grasping.

BACKGROUND OF THE DISCLOSURE

Aerial vehicles, such as micro aerial vehicles (MAVs), with multiple rotors (e.g., quadcopters) have been widely used in various scientific, recreational, and military applications, such as environmental monitoring, agricultural inspection, package delivery, and surveillance. Such multi-rotor aerial vehicles, or multicoptors, often face a common challenge in that they can fly for only a short period of time due to a limited onboard energy supply. In fact, the flight time for commercial MAVs is usually less than 30 minutes due to low aerodynamic efficiency and low energy storage capacity associated with the small scale of MAVs. See Crutsinger, G. M. et al., "The future of UAVs in ecology: an insider perspective from the Silicon Valley drone industry," *Journal of Unmanned Vehicle Systems*, vol. 4, no. 3, pp. 161-168, 2016; Floreano, D. et al., "Science, technology and the future of small autonomous drones," *Nature, vol.* 521, no. 7553, p. 460, 2015.

In some instances, the challenge of limited flight time may be partially addressed by allowing an aerial vehicle to land or perch on an object (e.g., a wall, tree, power line, or roof) in a manner similar to biological flyers (e.g., birds). See Liu, P. et al., "Flies land upside down on a ceiling using rapid visually-mediated rotational maneuvers," Science Advances, vol. 5, no. 10, p. eaax1877, 2019. Similar to biological flyers that can rest and feed after perching, MAVs also can perch to maintain a desired height and orientation to inspect, monitor, or even recharge. In this manner, perching may significantly extend an MAV's functioning time for long-duration monitoring tasks. See Kovac, M., "Learning from nature how to land aerial robots," *Science*, vol. 352, no. 6288, pp. 895-896, 2016. Such perching capability may be especially useful for monitoring-related tasks, as an aerial vehicle may maintain a perched position at a height suitable for monitoring or surveilling an interested area without flying, thereby conserving the vehicle's onboard energy supply. However, accomplishing reliable and robust perching for aerial vehicles may be challenging in view of the need to detect the perching object, estimate the vehicle's flight state (e.g., velocities, orientations), and plan proper trajectories, all of which should be conducted accurately and rapidly due to the fast movements of the vehicle. See Zhang, H. et al., "Vision based surface slope estimation for unmanned aerial vehicle perching," in *ASME* 2018 *Dynamic Systems and Control Conference*, pp. V002T21A004-V002T21A004, American Society of Mechanical Engineers, 2018; Zhang, H. et al., "Optimal trajectory generation for time-to-contact based aerial robotic perching," *Bioinspiration & Biomimetics*, vol. 14, no. 1, p. 016008, 2018. In addition to the estimation, planning, and control requirements, it may be equally important that a lightweight and reliable perching mechanism be designed to be reliably attached to and easily released from perching objects. In certain instances, it may be desirable for a mechanical perching mechanism to be able to absorb a landing impact, firmly attach to or grasp a desired perching object, and require low efforts for releasing. Further, it may be desirable to provide such a perching mechanism for smaller aerial vehicles, such as MAVs, which may be integrated with estimation, planning, and control algorithms to enable vision-guided autonomous perching.

In recent years, various perching mechanisms or methods for aerial vehicles have been investigated. See, e.g., Kovac, M. at pp. 895-896; Pope, M. T. et al., "A multimodal robot for perching and climbing on vertical outdoor surfaces," *IEEE Transactions on Robotics*, vol. 33, no. 1 pp. 38-48, 2017. Based on the perching objects used, most perching methods can be categorized into "surface perching" or "rod perching." Surface perching refers to instances in which the perching object is a flat surface, such as a wall or a ceiling, while rod perching refers to instances in which the perching object resembles a rod shape (e.g., tree branches).

For surface perching, adhesion pads and microspines have been widely used. For example, according to one perching mechanism, electrostatic adhesion was used to allow the ROBOBEE aerial vehicle to perch on and detach from surfaces formed of different materials. See Graule, M. et al., "Perching and takeoff of a robotic insect on overhangs using switchable electrostatic adhesion," *Science*, vol. 352, no. 6288, pp. 978-982 (2016). According to another perching method, a fixed-wing MAV was controlled to adhere itself to a perching surface with a sticky pad. See Anderson, M., "The sticky-pad plane and other innovative concepts for perching UAVs," in 47th *AIAA Aerospace Sciences Meeting Including the New Horizons Forum and Aerospace Exposition*, p. 40, 2009. As another example, a perching mechanism using fiber-based dry adhesives and a passive self-alignment system was implemented on a 300 g flying platform. See Daler, L. et al., "A perching mechanism for flying robots using a fibre-based adhesive," in 2013 *IEEE International Conference on Robotics and Automation*, pp. 4433-4438, May 2013. For another design, a 4.6 g perching mechanism was developed to convert an impact into a snapping motion for inserting a needle into a perching surface. See Kovac, M. et al., "A perching mechanism for micro aerial vehicles," *Journal of Micro-Nano Mechatronics*, vol. 5, no. 3-4, pp. 77-91, 2009. Another perching mechanism was proposed with spider-inspired tensile anchoring modules for launching several tensile anchors onto fixed objects to perch an MAV. See Zhang, K. et al., "SpiderMAV: Perching and stabilizing micro aerial vehicles with bio-inspired tensile anchoring systems," in 2017 *IEEE/RSJ International Conference on Intelligent Robots and Systems (IROS)*, pp. 6849-6854, September 2017. For another perching mechanism, a bird-like pitch-up strategy for a fixed-wing drone was proposed to decrease impact force and adjust perching orientation. See Mehanovic, D. et al., "Autonomous thrust-assisted perching of a fixed-wing UAV on vertical surfaces," in *Conference on Biomimetic and*

*Biohybrid Systems*, pp. 302-314, Springer, 2017. Yet another perching mechanism was developed with gecko-inspired adhesive grippers for perching on inclined surfaces. See Thomas, J. et al., "Aggressive flight with quadrotors for perching on inclined surfaces," *Journal of Mechanisms and Robotics*, vol. 8, no. 5, p. 051007, 2016. As another example, the Stanford Climbing and Aerial Maneuvering Platform (SCAMP) was developed with a mechanism for perching, climbing, and taking off again. See Pope, M. T. et al. at pp. 38-48.

For rod perching, perching mechanisms with grasping capability typically have been adopted. According to one design, a songbird-inspired perching mechanism was developed to utilize the weight of an MAV to passively apply tendon tension to actuate a gripping foot. See Doyle, C. E. et al., "An avian-inspired passive mechanism for quadrotor perching," *IEEE/ASME Transactions on Mechatronics*, vol. 18, no. 2, pp. 506-517, 2013. Another perching mechanism implemented a passively adaptive microspine grapple for conforming to the surface of convex perching targets such as tree branches. See Nguyen, H. et al., "A passively adaptive microspine grapple for robust, controllable perching," in 2019 *2nd IEEE International Conference on Soft Robotics (RoboSoft)*, pp. 80-87, April 2019. According to another design, a set of actuated landing gears were used to enable an MAV to perch or rest on many different types of objects. See Hang, K. et al., "Perching and resting paradigm for UAV maneuvering with modularized landing gears," *Science Robotics*, vol. 4, no. 28, p. eaau6637, 2019.

Although existing perching mechanisms may be suitable in certain applications, there remains a need for improved aerial vehicle mechanisms for perching and grasping.

SUMMARY OF THE DISCLOSURE

The present disclosure provides bistable grippers for aerial vehicles and related methods of using such bistable grippers for aerial perching and grasping. In one aspect, a bistable gripper for an aerial vehicle is provided. In one embodiment, a bistable gripper for an aerial vehicle may include a base, a first finger, a second finger, a switching pad, a first elastic connector, and a second elastic connector. The base may include a first beam and a second beam. The first finger may be pivotably attached to the first beam at a first joint, and the second finger may be pivotably attached to the second beam at a second joint. The switching pad may be configured for moving relative to the base. The first elastic connector may be attached to the switching pad and the first finger, and the second elastic connector may be attached to the switching pad and the second finger. The bistable gripper may be configured for switching between a closed stable state and an open stable state.

In some embodiments, the first beam and the second beam may be configured for storing strain energy when the bistable gripper is in the open stable state, and the first beam and the second beam may be configured for releasing the stored strain energy when the bistable gripper is switched from the open stable state to the closed stable state. In some embodiments, the first beam and the second beam may be configured for elastically deforming when the bistable gripper is switched from the closed stable state to the open stable state. In some embodiments, the first beam may be configured for elastically deforming from a first natural state to a first deformed state when the bistable gripper is switched from the closed stable state to the open stable state, and the first beam may be configured for returning from the first deformed state to the first natural state when the bistable gripper is switched from the open stable state to the closed stable state. In some embodiments, the second beam may be configured for elastically deforming from a second natural state to a second deformed state when the bistable gripper is switched from the closed stable state to the open stable state, and the second beam may be configured for returning from the second deformed state to the second natural state when the bistable gripper is switched from the open stable state to the closed stable state. In some embodiments, the base also may include a transverse beam extending between the first beam and the second beam. In some embodiments, the first beam, the second beam, and the transverse beam may be integrally formed with one another.

In some embodiments, the first finger may include a first lower finger portion and a first upper finger portion fixedly attached to one another, and the second finger may include a second lower finger portion and a second upper finger portion fixedly attached to one another. In some embodiments, the first lower finger portion and the first upper finger portion may be angled relative to one another to define a first acute angle therebetween, and the second lower finger portion and the second upper finger portion may be angled relative to one another to define a second acute angle therebetween. In some embodiments, the first lower finger portion may be pivotably attached to the first beam at the first joint, and the second lower finger portion may be pivotably attached to the second beam at the second joint. In some embodiments, the first finger may be configured for pivoting about the first joint from a first closed position to a first open position when the bistable gripper is switched from the closed stable state to the open stable state, and the first finger may be configured for pivoting about the first joint from the first open position to the first closed position when the bistable gripper is switched from the open stable state to the closed stable state. In some embodiments, the second finger may be configured for pivoting about the second joint from a second closed position to a second open position when the bistable gripper is switched from the closed stable state to the open stable state, and the second finger may be configured for pivoting about the second joint from the second open position to the second closed position when the bistable gripper is switched from the open stable state to the closed stable state. In some embodiments, the first finger and the second finger may be configured for pivoting such that the first upper finger portion and the second upper finger portion move away from one another when the bistable gripper is switched from the closed stable state to the open stable state and such that the first upper finger portion and the second upper finger portion move toward one another when the bistable gripper is switched from the open stable state to the closed stable state.

In some embodiments, the bistable gripper also may include a first foot pivotably attached to the first upper finger portion, and a second foot pivotably attached to the second upper finger portion. The first foot may include a first rigid base portion and a first elastomeric portion attached to the first rigid base portion. The second foot may include a second rigid base portion and a second elastomeric portion attached to the second rigid base portion. In some embodiments, the switching pad may be configured for translating in a first direction from a first position to a second position when the bistable gripper is switched from the closed stable state to the open stable state, and the switching pad may be configured for translating in an opposite second direction from the second position to the first position when the bistable gripper is switched from the open stable state to the closed stable state. In some embodiments, the bistable gripper may be configured for switching from the closed stable state to the open stable state upon application of a first force to the switching pad in the first direction, and the bistable gripper may be configured for switching from the open stable state to the closed stable state upon application of a second force to the switching pad in the second direction. In some embodiments, the first force may be greater than the second force. In some embodiments, the bistable gripper also may include a motor-driven lever mechanism configured for applying the first force to the switching pad. In some embodiments, the motor-driven lever mechanism may include a motor including a rotatable shaft, a lever configured for engaging the switching pad, and a cable attached to the rotatable shaft and the lever.

In some embodiments, the first elastic connector and the second elastic connector may be configured for storing strain energy when the bistable gripper is in the open stable state, and the first elastic connector and the second elastic connector may be configured for releasing the stored strain energy when the bistable gripper is switched from the open stable state to the closed stable state. In some embodiments, the first elastic connector and the second elastic connector may be configured for elastically deforming when the bistable gripper is switched from the closed stable state to the open stable state. In some embodiments, the first elastic connector may be configured for elastically deforming from a first natural state to a first deformed state when the bistable gripper is switched from the closed stable state to the open stable state, and the first elastic connector may be configured for returning from the first deformed state to the first natural state when the bistable gripper is switched from the open stable state to the closed stable state. In some embodiments, the second elastic connector may be configured for elastically deforming from a second natural state to a second deformed state when the bistable gripper is switched from the closed stable state to the open stable state, and the second elastic connector may be configured for returning from the second deformed state to the second natural state when the bistable gripper is switched from the open stable state to the closed stable state. In some embodiments, the first elastic connector may include a first tube, and the second elastic connector may include a second tube.

In another embodiment, a bistable gripper for an aerial vehicle may include a base, a first finger, a second finger, a switching pad, a first elastic connector, and a second elastic connector. The first finger may be pivotably attached to the base at a first joint, and the second finger may be pivotably attached to the base at a second joint. The switching pad may be configured for moving relative to the base. The first elastic connector may be attached to the switching pad and the first finger, and the second elastic connector may be attached to the switching pad and the second finger. The bistable gripper may be configured for switching between a closed stable state and an open stable state. The first elastic connector and the second elastic connector may be configured for storing strain energy when the bistable gripper is in the open stable state, and the first elastic connector and the second elastic connector may be configured for releasing the stored strain energy when the bistable gripper is switched from the open stable state to the closed stable state.

In still another embodiment, a bistable gripper for an aerial vehicle may include a base, a first finger, a second finger, a switching pad, a first connector, and a second connector. The base may include a first beam and a second beam. The first finger may be pivotably attached to the first beam at a first joint, and the second finger may be pivotably attached to the second beam at a second joint. The switching pad may be configured for moving relative to the base. The first connector may be attached to the switching pad and the first finger, and the second connector may be attached to the switching pad and the second finger. The bistable gripper may be configured for switching between a closed stable state and an open stable state. The first beam and the second beam may be configured for storing strain energy when the bistable gripper is in the open stable state, and the first beam and the second beam may be configured for releasing the stored strain energy when the bistable gripper is switched from the open stable state to the closed stable state.

These and other aspects and improvements of the present disclosure will become apparent to one of ordinary skill in the art upon review of the following detailed description when taken in conjunction with the several drawings and the appended claims.

Figure 1A:
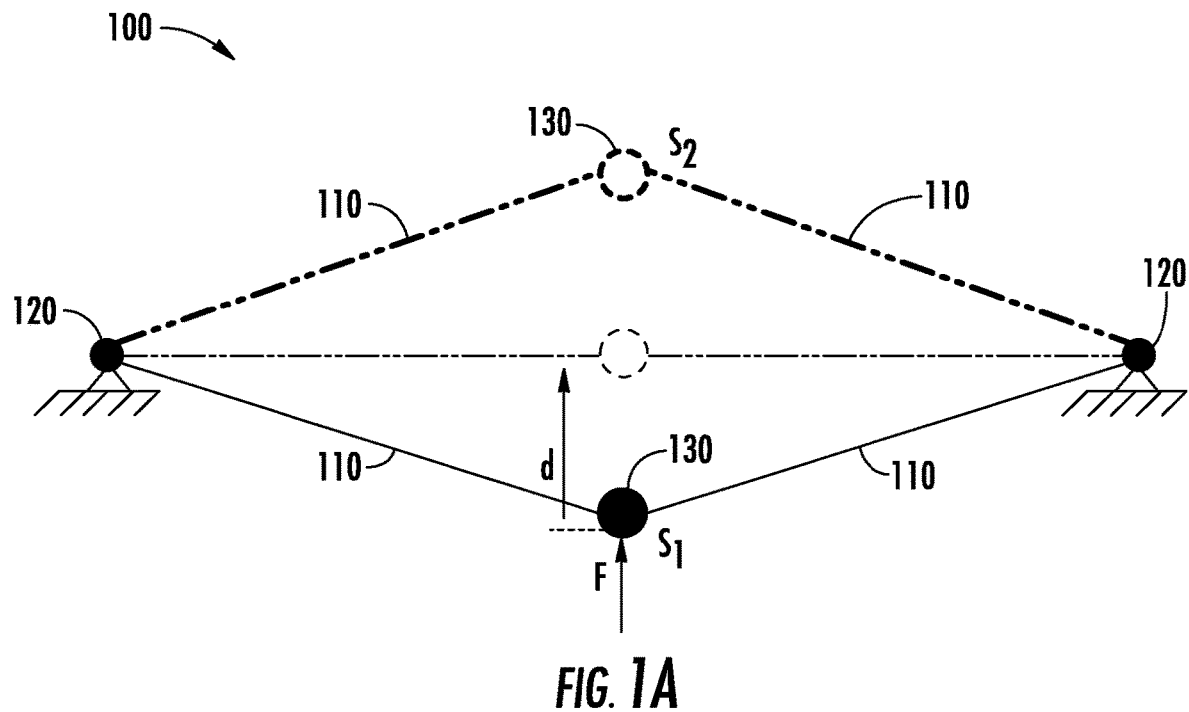
FIG. 1A is a schematic diagram of a Von Mises Truss having two stable states.

The detailed description is set forth with reference to the accompanying drawings. The drawings are provided for purposes of illustration only and merely depict example embodiments of the disclosure. The drawings are provided to facilitate understanding of the disclosure and shall not be deemed to limit the breadth, scope, or applicability of the disclosure. The use of the same reference numerals indicates similar, but not necessarily the same or identical components. Different reference numerals may be used to identify similar components. Various embodiments may utilize elements or components other than those illustrated in the drawings, and some elements and/or components may not be present in various embodiments. The use of singular terminology to describe a component or element may, depending on the context, encompass a plural number of such components or elements and vice versa.

DETAILED DESCRIPTION OF THE DISCLOSURE

In the following description, specific details are set forth describing some embodiments consistent with the present disclosure. Numerous specific details are set forth in order to provide a thorough understanding of the embodiments. It will be apparent, however, to one skilled in the art that some embodiments may be practiced without some or all of these specific details. The specific embodiments disclosed herein are meant to be illustrative but not limiting. One skilled in the art may realize other elements that, although not specifically described here, are within the scope and the spirit of this disclosure. In addition, to avoid unnecessary repetition, one or more features shown and described in association with one embodiment may be incorporated into other embodiments unless specifically described otherwise or if the one or more features would make an embodiment non-functional. In some instances, well known methods, procedures, components, and circuits have not been described in detail so as not to unnecessarily obscure aspects of the embodiments.

Embodiments of bistable grippers for aerial vehicles and related methods of using such bistable grippers for aerial perching and grasping are provided. As described herein, the bistable grippers may be configured for switching between a closed stable state and an open stable state. Such configuration may provide multiple advantages and benefits as compared to existing perching mechanisms and methods. For example, the bistable grippers described herein may leverage an impact force during perching to passively perch. In this manner, such bistable grippers may provide a robust perching mechanism and eliminate the requirement for a sensor to detect the impact and an actuator to close the gripper. Moreover, the bistable grippers described herein may not require additional energy input to maintain the stable states. As a result, such grippers may be particularly useful for applications requiring long-duration monitoring or surveillance. Further advantages and benefits of the bistable grippers and related methods provided herein over existing technology will be appreciated by one of ordinary skill in the art in view of the teachings provided herein.

As used herein, the term "bistable," with reference to a mechanism, such as a gripper, refers to a mechanism that can be maintained in two stable states without energy input and can be switched from one of the stable states to the other stable state by application of an activation force.

Bistable mechanisms have been widely used in different areas of technology. See Howell, L. L., *Compliant Mechanisms*, John Wiley & Sons, 2001. In the area of gripper mechanisms, bistable grippers have been developed for grasping and releasing objects. See Nguyen, T.-A. et al., "A gripper based on a compliant bistable mechanism for gripping and active release of objects," in *Manipulation, Automation and Robotics at Small Scales (MARSS) International Conference*, pp. 1-4, IEEE, 2016. In some instances, soft bistable grippers have been designed to rapidly grasp unstructured objects. See Thuruthel, T. G. et al., "A bistable soft gripper with mechanically embedded sensing and actuation for fast closed-loop grasping," *arXiv preprint arXiv: 1902.04896*, 2019. In other technology areas, the bistability for carefully designed mechanical structures also has been exploited for various applications including deployable structures (see Schioler, T. et al., "Space frames with multiple stable configurations," *AIAA Journal*, vol. 45, no. 7, pp. 1740-1747, 2007; Chen, T. et al., "Integrated design and simulation of tunable, multi-state structures fabricated monolithically with multi-material 3D printing," *Scientific Reports*, vol. 7, p. 45671, 2017), jumping robots (see Noh, M. et al., "Flea-inspired catapult mechanism for miniature jumping robots," *IEEE Transactions on Robotics*, vol. 28, no. 5, pp. 1007-1018, 2012; Koh, J.-S. et al., "Jumping on water: Surface-tension dominated jumping of water striders and robotic insects," *Science*, vol. 349, no. 6247, pp. 517-521, 2015), swimming robots (see Chen, T. et al., "Harnessing bistability for directional propulsion of soft, untethered robots," *Proceedings of the National Academy of Sciences*, p. 201800386, 2018), origami robots (see Faber, J. A. et al., "Bioinspired spring origami," Science, vol. 359, no. 6382, pp. 1386-1391, 2018; Mintchev, S. et al., "Bioinspired dual-stiffness origami," *Science Robotics*, vol. 3, no. 20, p. eaau0275, 2018), soft robots (see Rothemund, P. et al., "A soft, bistable valve for autonomous control of soft actuators," *Science Robotics*, vol. 3, no. 16, p. eaar7986, 2018), shape morphing (see Alqasimi, A. et al., "Design of a linear bistable compliant crank-slider mechanism," *Journal of Mechanisms and Robotics*, vol. 8, no. 5, p. 051009, 2016), and mechanical metamaterials (see Silverberg, J. L. et al., "Origami structures with a critical transition to bistability arising from hidden degrees of freedom," *Nature Materials*, vol. 14, no. 4, p. 389, 2015; Haghpanah, B. et al., "Multistable shape-reconfigurable architected materials," *Advanced Materials*, vol. 28, no. 36, pp. 7915-7920, 2016). However, aside from the work of the present inventors, use of bistable mechanisms for aerial vehicles to facilitate aerial perching and grasping remains undeveloped.

As described below, a bistable gripper for an aerial vehicle may be configured for switching between a closed stable state and an open stable state. In some embodiments, the bistable gripper may include a base having a plurality of beams, a plurality of fingers, a switching pad, and a plurality of elastic connectors. The beams may be configured for elastically deforming when the bistable gripper is switched from the closed stable state to the open stable state. The fingers may be pivotably attached to the beams at respective joints and configured for pivoting about the joints when the bistable gripper is switched between the closed stable state and the open stable state. The switching pad may be configured for moving relative to the base when the bistable gripper is switched between the closed stable state and the open stable state. The elastic connectors may be attached to the switching pad and the fingers, with each of the elastic connectors being attached to one of the fingers. The elastic connectors may be configured for elastically deforming when the bistable gripper is switched from the closed stable state to the open stable state.

As described herein, the bistability of the bistable gripper may be provided, at least in part, by the beams and the elastic connectors. For example, the beams may be configured for storing strain energy when the bistable gripper is in the open stable state and releasing the stored strain energy when the bistable gripper is switched from the open stable state to the closed stable state. Further, the elastic connectors may be configured for storing strain energy when the bistable gripper is in the open stable state and releasing the stored strain energy when the bistable gripper is switched from the open stable state to the closed stable state. The bistable gripper may be switched from the closed stable state to the open stable state upon application of a first activation force to the switching pad in a first direction, and the bistable gripper may be switched from the open stable state to the closed stable state upon application of a second activation force to the switching pad in an opposite second direction. In some embodiments, the first activation force may be applied to the switching pad by a motor-driven lever mechanism of the bistable gripper. In some embodiments, the second activation force may be an impact force applied to the switching pad by a perching object as the switching pad contacts the object. In this manner, the bistable gripper may enable passive perching for an aerial vehicle. In some embodiments, the first activation force may be greater than the second activation force. In this manner, the bistable gripper may close easily and may provide a stable grasp of a perching object.

The bistable grippers and related methods described herein may be used in a variety of applications. For example, such grippers and methods may be used in various scientific, recreational, and military applications, such as environmental monitoring, agricultural inspection, package delivery, and surveillance. The bistable grippers and methods may be particularly beneficial for use with micro aerial vehicles to partially address the problem of limited flight time caused by low aerodynamic efficiency and high energy consumption. However, the bistable grippers and methods similarly may be used for larger aerial vehicles. Further applications and uses of the described bistable grippers and methods will be appreciated by one of ordinary skill in the art in view of the teachings provided herein.

Figure 1B:
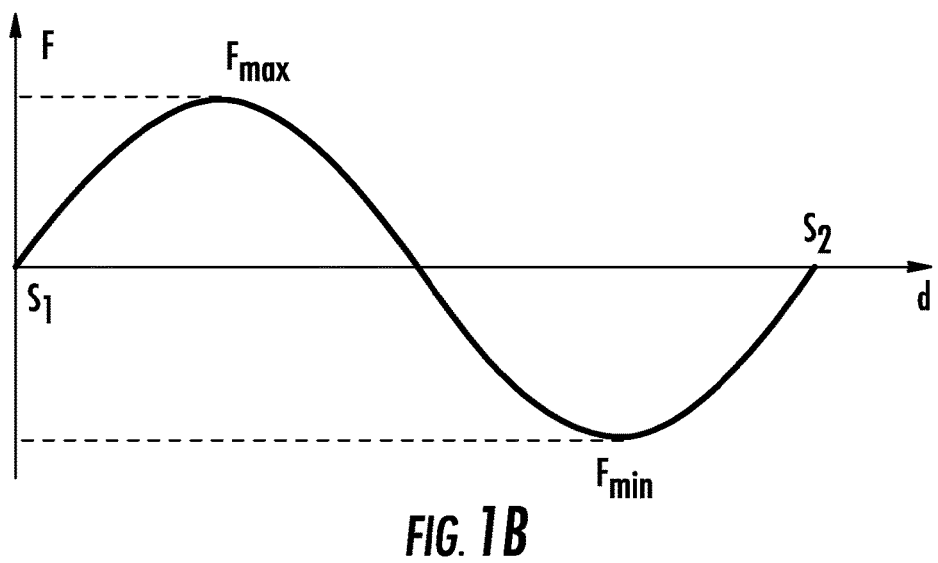
FIG. 1B is a line graph of force as a function of displacement, illustrating force-displacement characteristics of the Von Mises Truss of FIG. 1A.

The bistable grippers provided herein are based on one of the basic bistable mechanisms—the von Mises truss, which utilizes buckling behavior of the truss to change stable states. See Mises, R., "Über die Stabilitätsprobleme der Elastizitätstheorie," *ZAMM Journal of Applied Mathematics and Mechanics/Zeitschrift für Angewandte Mathematik und Mechanik*, vol. 3, no. 6, pp. 406-422, 1923. FIG. 1A schematically illustrates a basic von Mises truss 100 including two identical beams 110 each connected to a respective base rotational joint 120 and to a common apex rotational joint 130. The truss 100 has two stable configurations, or states, in which no force input is needed to maintain the configuration. As shown, the truss 100 has a first stable configuration $S_1$ and a second stable configuration $S_2$ and is configured for switching between the stable configurations $S_1$, $S_2$ upon application of external forces. For example, starting at the first stable configuration $S_1$ and upon application of a force F upward, the apex rotational joint 130 will move upward to switch the truss 100 to the second stable configuration $S_2$. During the switch, the truss 100 will buckle to allow the movement of the apex rotational joint 130 from its position in the first stable configuration $S_1$ to its position in the second stable configuration $S_2$. To make the truss 100 buckle, the force F will be a function of the displacement d of the apex rotational joint 130. FIG. 1B illustrates the relationship between the force F and the displacement d, which is referred to as "force-displacement characteristics." The force-displacement characteristics include two critical forces, a maximum force $F_{max}$ and a minimum force $F_{min}$, which also may be referred to as "activation forces." In this manner, a force greater than the maximum force $F_{max}$ must be applied to switch the truss 100 from the first stable configuration $S_1$ to the second stable configuration $S_2$, and a force greater than the absolute value of the minimum force $F_{min}$ must be applied to switch the truss 100 from the second stable configuration $S_2$ to the first stable configuration $S_1$. For the truss 100, the relationship between the force F and the displacement d is symmetric about the horizontal axis, as shown in FIG. 1B, such that the maximum force $F_{max}$ and the minimum force $F_{min}$ have the same magnitude.

Although the configurations of the bistable grippers described herein are based on the von Mises truss, they are different from the von Mises truss in that the force-displacement characteristics can be tuned to have a maximum force $F_{max}$ and a minimum force $F_{min}$ of different magnitudes. For example, respective magnitudes of the maximum force $F_{max}$ and the minimum force $F_{min}$ may be selected such that a bistable gripper is easy to switch from an open stable state to a closed stable state and also provides a stable hold when the gripper is in the closed stable state. Such an asymmetric force-displacement relationship may be advantageous when the bistable gripper is used for perching, for example, to allow the gripper to be easily switched from the open stable state to the closed stable state for grasping a perching object and to maintain a stable grasp of the perching object until release therefrom is desired.

Figure 2A:
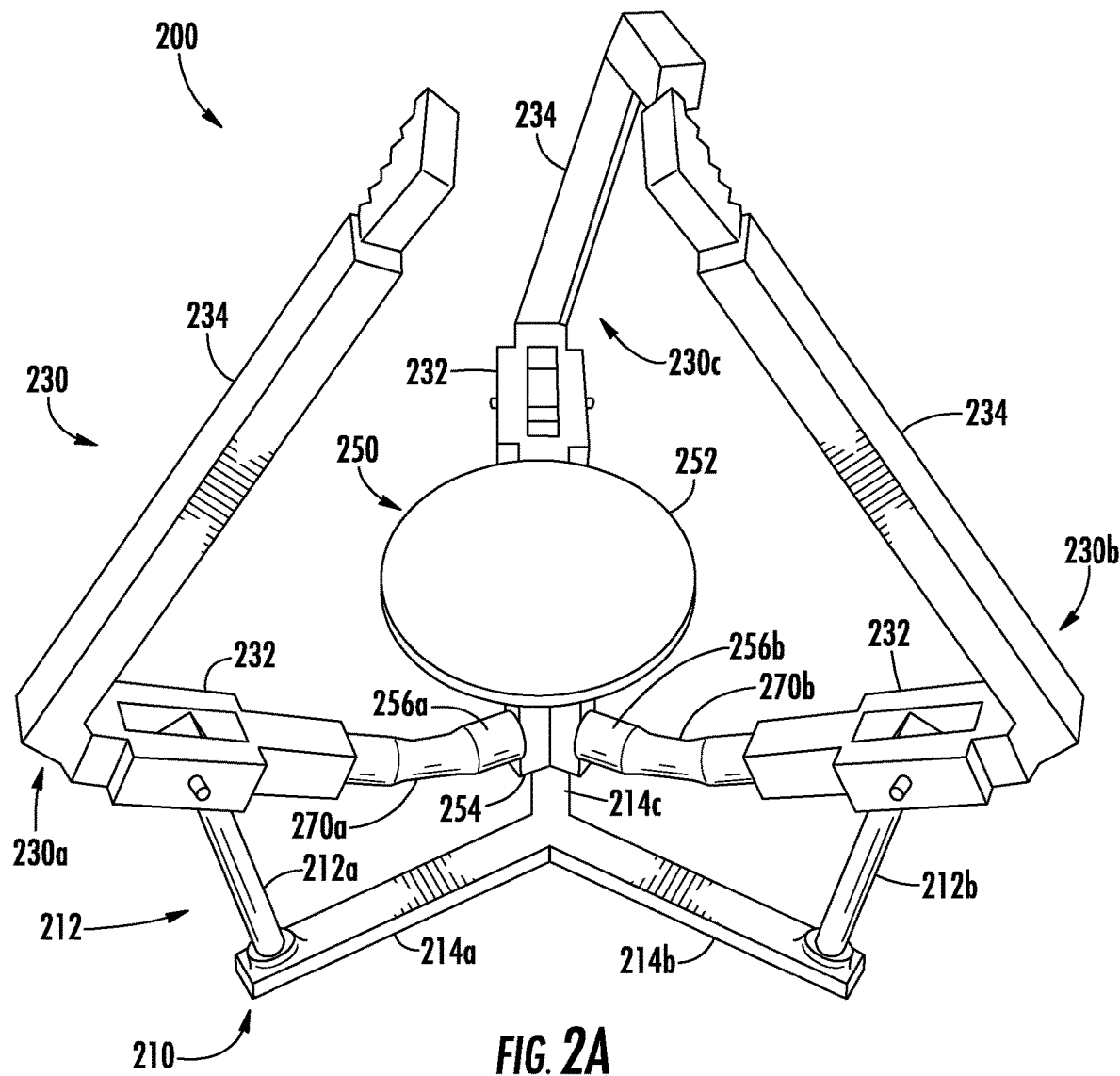
FIG. 2A is a perspective view of a gripper in accordance with one or more embodiments of the disclosure, showing a plurality of beams, a plurality of fingers, a switching pad, and a plurality of elastic connectors of the gripper, with the gripper in a closed stable state.
Figure 2B:
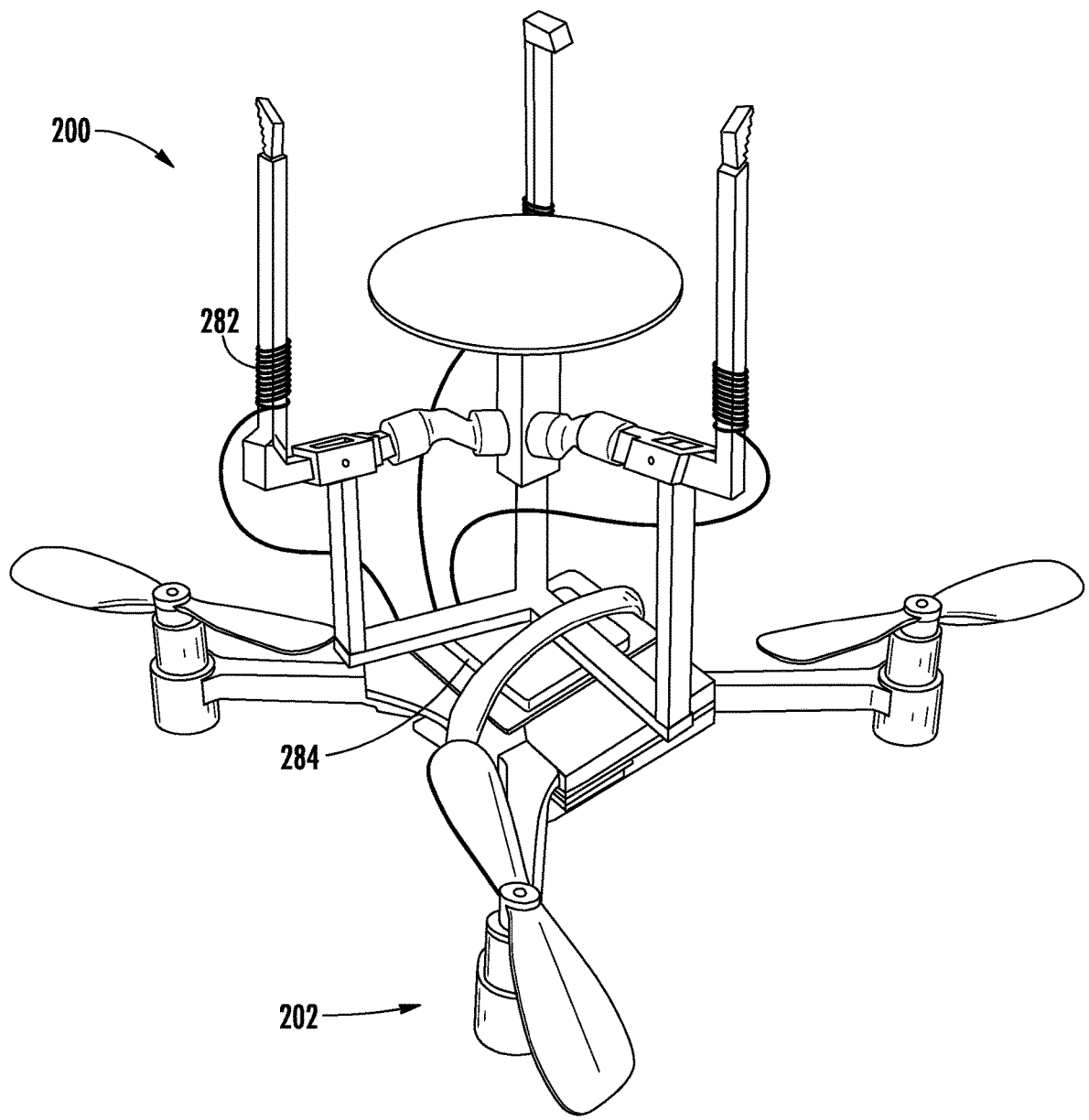
FIG. 2B is a perspective view of the gripper of FIG. 2A mounted to an aerial vehicle in accordance with one or more embodiments of the disclosure, showing the gripper in an open stable state.
Figure 2C:
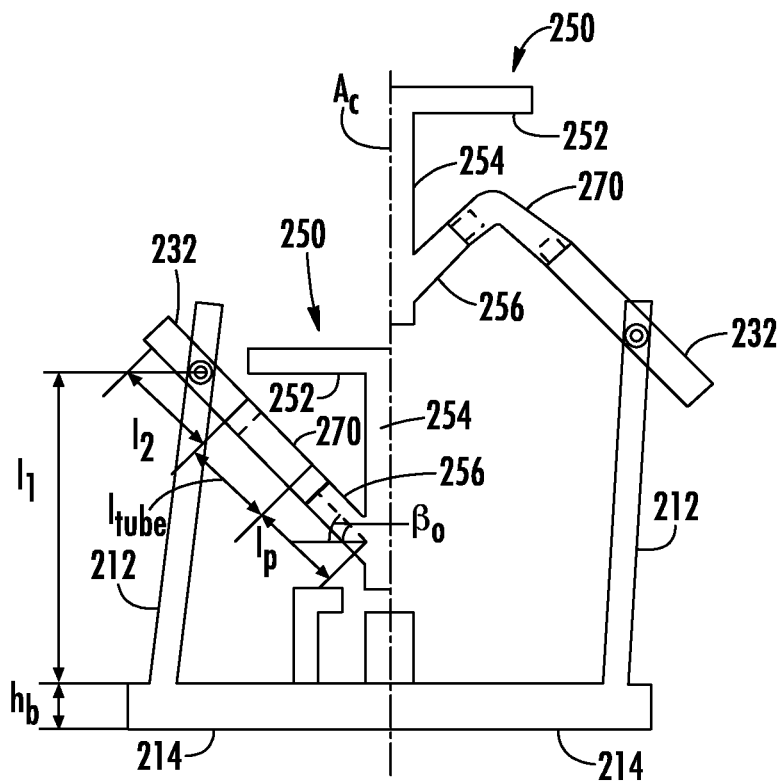
FIG. 2C is a schematic diagram of the gripper of FIG. 2A, showing the gripper in the closed stable state (left side) and the open stable state (right side).

FIGS. 2A-2C illustrate a bistable gripper 200 (which also may be referred to simply as a "gripper") in accordance with one or more embodiments of the disclosure. The bistable gripper 200 may be configured for switching between a closed stable state and an open stable state. FIG. 2A shows the bistable gripper 200 in an example closed stable state, while FIG. 2B shows the gripper 200 in an example open stable state. FIG. 2C shows a portion of the bistable gripper 200 in an example closed stable state (left side) and an example open stable state (right side). As described below, the bistable gripper 200 may be used with an aerial vehicle to facilitate aerial perching and grasping. For example, the bistable gripper 200 may be mounted to an aerial vehicle 202, as shown in FIG. 2B, to allow for perching of the aerial vehicle 202 on a perching object. According to the illustrated embodiment, the bistable gripper 200 may include a base 210, a plurality of fingers 230, a switching pad 250, and a plurality of elastic connectors 270. It will be appreciated that alternative configurations and arrangements of the illustrated components and/or features thereof may be used in other embodiments of the bistable gripper 200. Further, in certain embodiments, one or more of the illustrated components and/or features may be omitted, and additional components and/or features may be provided as part of the bistable gripper 200.

The base 210 may provide a support structure for the remaining components of the bistable gripper 200 and may facilitate attachment of the gripper 200 to an aerial vehicle. The base 210 may include a plurality of beams 212 spaced apart from one another. As shown, the base 210 may include a first beam 212a, a second beam 212b, and a third beam 212c equally spaced apart from one another and arranged in an array about the central axis Ac of the bistable gripper 200. Although the illustrated embodiment is provided with three beams 212, any number of the beams 212, such as two, four, five, six, or more, may be used in other embodiments. As shown, each of the beams 212 may be formed as an elongated member extending vertically. In some embodiments, each of the beams 212 may have a linear shape. In other embodiments, each of the beams 212 may have a non-linear shape, such as a curved or otherwise contoured shape. In some embodiments, the shape and dimensions of the beams 212 may be identical to one another. The base 210 also may include one or more structures connecting the beams 212. For example, the base 210 may include one or more transverse beams 214 extending between the beams 212. As shown, the base 210 may include a first transverse beam 214a, a second transverse beam 214b, and a third transverse beam 214c connected to the respective beams 212a, 212b, 212c and to one another along the central axis Ac of the bistable gripper 200. The beams 212 may be fixedly attached to the transverse beams 214. In some embodiments, the beams 212 and the transverse beams 214 may be integrally formed with one another, such that the base 210 is provided as a unitary component. In other embodiments, the beams 212 and the transverse beams 214 may be separately formed and then fixedly attached to one another. In some embodiments, other types of structures, such as a plate, a disk, or a web, may be used for connecting the beams 212 to define their spaced apart arrangement. In some embodiments, the base 210 may be formed of a thermoplastic material, such as polylactic acid (PLA), polyethylene terephthalate (PET), or glycol-modified PET (PETG), although other suitable materials may be used in other embodiments. In some embodiments, the base 210 may be formed by additive manufacturing, such as three-dimensional printing, although other suitable techniques may be used.

Each of the beams 212 may be configured for elastically deforming when the bistable gripper 200 is switched from the closed stable state to the open stable state. For example, the beams 212 may be configured for elastically bending when the bistable gripper 200 is switched from the closed stable state to the open stable state. Each of the beams 212 may be configured for assuming a first state when the bistable gripper 200 is in the closed stable state and a different second state when the gripper 200 is in the open stable state. In this manner, each of the beams 212 may be configured for elastically deforming from the first state to the second state when the bistable gripper 200 is switched from the closed stable state to the open stable state. Further, each of the beams 212 may be configured for returning from the second state to the first state when the bistable gripper 200 is switched from the open stable state to the closed stable state. In some embodiments, for each of the beams 212, the first state may be a natural state (i.e., a state of the beam 212 absent application of external forces), and the second state may be a deformed state (i.e., a state of the beam 212 in which the beam 212 is deformed from the natural state due to application of an external force). In view of the elastic deformation of the beams 212, each of the beams 212 may be configured for storing potential energy and releasing the stored energy during use of the bistable gripper 200. For example, each of the beams 212 may be configured for storing strain energy when the bistable gripper 200 is in the open stable state and for releasing the stored strain energy when the gripper 200 is switched from the open stable state to the closed stable state.

In some embodiments, as shown, the beams 212 may be configured for elastically deforming away from the central axis Ac and one another when the bistable gripper 200 is switched from the closed stable state to the open stable state and for returning toward the central axis Ac and one another when the gripper 200 is switched from the open stable state to the closed stable state. In some embodiments, as shown, each of the beams 212 may be angled toward the central axis Ac when in the first state (i.e., when the gripper 200 is in the closed stable state), and each of the beams 212 may be angled away from the central axis Ac when in the second state (i.e., when the gripper 200 is in the open stable state). In other embodiments, each of the beams 212 may extend parallel to the central axis Ac when in one of the first state or the second state. It will be appreciated that the illustrated embodiment provides merely an example configuration of the beams 212 and their movement between the first state and the second state upon switching of the gripper 200 between the closed stable state and the open stable state, and that other configurations of the beams 212 may be used in other embodiments.

The fingers 230 may be pivotably attached to the beams 212 at respective joints. As shown, the bistable gripper 200 may include a first finger 230a pivotably attached to the first beam 212a at a first joint, a second finger 230b pivotably attached to the second beam 212b at a second joint, and a third finger 230c pivotably attached to the third beam 212c at a third joint. Although the illustrated embodiment is provided with three fingers 230, any number of the fingers 230, such as two, four, five, six, or more, may be used in other embodiments. The number of the fingers 230 may correspond to the number of the beams 212 of the bistable gripper 200. As shown, each of the fingers 230 may include a lower finger portion 232 and an upper finger portion 234 fixedly attached to one another. In some embodiments, as shown, the lower finger portion 232 and the upper finger portion 234 may be formed as elongated members that are angled relative to one another to define an acute angle therebetween. In some embodiments, each of the lower finger portion 232 and the upper finger portion 234 may have a linear shape. In other embodiments, one or both of the lower finger portion 232 and the upper finger portion 234 may have a non-linear shape, such as a curved or otherwise contoured shape. In some embodiments, the lower finger portion 232 and the upper finger portion 234 may be integrally formed with one another, such that each of the fingers 230 is provided as a unitary component. In other embodiments, the lower finger portion 232 and the upper finger portion 234 may be separately formed and then fixedly attached to one another. In some embodiments, the shape and dimensions of the fingers 230 may be identical to one another. In some embodiments, the fingers 230 may be configured for inhibiting deformation of the fingers 230 during use of the bistable gripper 200. For example, the dimensions, features, and material of the fingers 230 may be selected to inhibit deformation of the fingers 230. In some embodiments, the fingers 230 may be formed of a thermoplastic material, such as PLA, PET, or PETG, although other suitable materials may be used in other embodiments. In some embodiments, the fingers 230 may be formed by additive manufacturing, such as three-dimensional printing, although other suitable techniques may be used.

The fingers 230 may be configured for pivoting relative to the respective beams 212 about the respective joints when the bistable gripper 200 is switched between the closed stable state and the open stable state. Each of the fingers 230 may be configured for assuming a first position when the bistable gripper 200 is in the closed stable state and a different second position when the gripper 200 is in the open stable state. In this manner, each of the fingers 230 may be configured for pivoting about the respective joint from the first position to the second position when the bistable gripper 200 is switched from the closed stable state to the open stable state. Further, each of the fingers 230 may be configured for pivoting about the respective joint from the second position to the first position when the bistable gripper 200 is switched from the open stable state to the closed stable state. In some embodiments, as shown, the lower finger portions 232 of the fingers 230 may be pivotably attached to the respective beams 212 at the respective joints. In other embodiments, the upper finger portions 234 of the fingers 230 may be pivotably attached to the respective beams 212 at the respective joints.

In some embodiments, as shown, the fingers 230 may be configured for pivoting such that the upper finger portions 234 move away from the central axis Ac and one another when the gripper 200 is switched from the closed stable state to the open stable state and such that the upper finger portions 234 move toward the central axis Ac and one another when the gripper 200 is switched from the open stable state to the closed stable state. In this manner, the fingers 230 collectively may have a first closed configuration when the gripper 200 is in the closed stable state and a second open configuration when the gripper 200 is in the open stable state. The open configuration of the fingers 230 may be suitable for positioning the fingers 230 at least partially around an object, such as a perching object, for grasping and releasing the object, while the closed configuration of the fingers 230 may be suitable for maintaining a grasp of the object. In some embodiments, as shown, the joints between the fingers 230 and the beams 212 may be pin joints. Other types of joints for pivotably attaching the fingers 230 and the beams 212 and allowing pivoting of the fingers 230 may be used in other embodiments. It will be appreciated that the illustrated embodiment provides merely an example configuration of the fingers 230 and their movement between the first position and the second position upon switching of the gripper 200 between the closed stable state and the open stable state, and that other configurations of the fingers 230 may be used in other embodiments.

The switching pad 250 (which also may be referred to as a "contact pad") may be configured for moving relative to the base 210 when the bistable gripper 200 is switched between the closed stable state and the open stable state. For example, the switching pad 250 may be configured for translating relative to the base 210 between a first position and a second position when the gripper 200 is switched between the closed stable state and the open stable state. As shown, the switching pad 250 may be configured for translating in a first direction from the first position to the second position when the gripper 200 is switched from the closed stable state to the open stable state and for translating in an opposite second direction from the second position to the first position when the gripper 200 is switched from the open stable state to the closed stable state. As described further below, movement of the switching pad 250 between the first position and the second position may facilitate switching of the bistable gripper 200 between the closed stable state and the open stable state.

In some embodiments, as shown, the switching pad 250 may include a platform 252, a support 254, and a plurality of arms 256. The platform 252 may be configured for contacting an object, such as a perching object, to facilitate movement of the switching pad 250 from the second position to the first position and switching of the bistable gripper 200 from the open stable state to the closed stable state. In some embodiments, the platform 252 may be formed as a plate, such as a circular disk, although other configurations and shapes of the platform 252 may be used in other embodiments. The platform 252 may include a top surface configured for contacting objects. In some embodiments, as shown, the top surface may be a planar surface, although a curved or otherwise contoured top surface may be used in other embodiments. The support 254 may be configured for supporting the platform 252 and transferring forces applied to the platform 252 to other components of the bistable gripper 200, as described below, to facilitate switching of the gripper 200 from the open stable state to the closed stable state. In some embodiments, the support 254 may be formed as an elongated member extending downward from the platform 252, although other configurations and shapes of the support 254 may be used in other embodiments. In some embodiments, as shown, the switching pad 250 may be centered on the central axis Ac, with the support 254 extending along the central axis Ac, although other positions of the support 254 and the overall switching pad 250 may be used in other embodiments.

The arms 256 may be configured for attaching the elastic connectors 270 to the switching pad 250. As shown, the switching pad 250 may include a first arm 256a, a second arm 256b, and a third arm 256c. Although the illustrated embodiment is provided with three arms 256, any number of the arms 256, such as two, four, five, six, or more, may be used in other embodiments. The number of the arms 256 may correspond to the number of the elastic connectors 270 of the bistable gripper 200. As shown, each of the arms 256 may extend outward from the support 254. In some embodiments, as shown, each of the arms 256 may be angled relative to the support 254 to define an acute angle therebetween. In some embodiments, the platform 252, the support 254, and the arms 256 may be integrally formed with one another, such that the switching pad 250 is provided as a unitary component. In other embodiments, two or more of the platform 252, the support 254, and the arms 256 may be separately formed and then fixedly attached to one another. In some embodiments, the switching pad 250 may be configured for inhibiting deformation of the switching pad 250 during use of the bistable gripper 200. For example, the dimensions, features, and material of the switching pad 250 may be selected to inhibit deformation of the switching pad 250. In some embodiments, the switching pad 250 may be formed of a thermoplastic material, such as PLA, PET, or PETG, although other suitable materials may be used in other embodiments. In some embodiments, the switching pad 250 may be formed by additive manufacturing, such as three-dimensional printing, although other suitable techniques may be used. It will be appreciated that the illustrated embodiment provides merely an example configuration of the switching pad 250 and its movement between the first position and the second position upon switching of the gripper 200 between the closed stable state and the open stable state, and that other configurations of the switching pad 250 may be used in other embodiments.

The elastic connectors 270 may be attached to the switching pad 250 and the respective fingers 230. As shown, the bistable gripper 200 may include a first elastic connector 270a attached to the first arm 256a of the switching pad 250 and the first finger 230a, a second elastic connector 270b attached to the second arm 256b of the switching pad 250 and the second finger 230b, and a third elastic connector 270c attached to the third arm 256c of the switching pad 250 and the third finger 230c. Although the illustrated embodiment is provided with three elastic connectors 270, any number of the elastic connectors 270, such as two, four, five, six, or more, may be used in other embodiments. The number of the elastic connectors 270 may correspond to the number of the fingers 230. As shown, each of the elastic connectors 270 may be formed as an elongated member extending from the respective arm 256 of the switching pad 250 to the lower finger portion 232 of the respective finger 230. In some embodiments, as shown, each of the elastic connectors 270 may be formed as a hollow member, such as a tube. In other embodiments, each of the elastic connectors 270 may be formed as a solid member, such as a rod or a band. In some embodiments, each of the elastic connectors 270 may have a linear shape. In other embodiments, each of the elastic connectors 270 may have a non-linear shape, such as a curved or otherwise contoured shape. In some embodiments, the shape and dimensions of the elastic connectors 270 may be identical to one another. In some embodiments, the elastic connectors 270 may be formed of silicone, although other suitable elastic materials may be used in other embodiments. In some embodiments, as shown, each of the elastic connectors 270 may be attached to the switching pad 250 and the respective finger 230 by a first end portion of the connector 270 being mated over a free end portion of the respective arm 256 of the switching pad 250 and a second end portion of the connector 270 being mated over a free end portion of the lower finger portion 232 of the respective finger 230. In other embodiments, each of the elastic connectors 270 may be attached to the switching pad 250 and the respective finger 230 by a first end portion of the connector 270 being mated within a free end portion of the respective arm 256 of the switching pad 250 and a second end portion of the connector 270 being mated within a free end portion of the lower finger portion 232 of the respective finger 230. Still other means for attaching the elastic connectors 270 to the switching pad 250 and the fingers 230, such as fasteners or adhesives, may be used. In some embodiments, the elastic connectors 270 may be fixedly attached to the switching pad 250 and the respective fingers 230. In other embodiments, the elastic connectors 270 may be removably attached to the switching pad 250 and the respective fingers 230.

Each of the elastic connectors 270 may be configured for elastically deforming when the bistable gripper 200 is switched from the closed stable state to the open stable state. For example, the elastic connectors 270 may be configured for elastically bending when the bistable gripper 200 is switched from the closed stable state to the open stable state. Each of the elastic connectors 270 may be configured for assuming a first state when the bistable gripper 200 is in the closed stable state and a different second state when the gripper 200 is in the open stable state. In this manner, each of the elastic connectors 270 may be configured for elastically deforming from the first state to the second state when the bistable gripper 200 is switched from the closed stable state to the open stable state. Further, each of the elastic connectors 270 may be configured for returning from the second state to the first state when the bistable gripper 200 is switched from the open stable state to the closed stable state. In some embodiments, for each of the elastic connectors 270, the first state may be a natural state (i.e., a state of the elastic connector 270 absent application of external forces), and the second state may be a deformed state (i.e., a state of the elastic connector 270 in which the elastic connector 270 is deformed from the natural state due to application of an external force). In view of the elastic deformation of the elastic connectors 270, each of the elastic connectors 270 may be configured for storing potential energy and releasing the stored energy during use of the bistable gripper 200. For example, each of the elastic connectors 270 may be configured for storing strain energy when the bistable gripper 200 is in the open stable state and for releasing the stored strain energy when the gripper 200 is switched from the open stable state to the closed stable state. It will be appreciated that the illustrated embodiment provides merely an example configuration of the elastic connectors 270 and their movement between the first state and the second state upon switching of the gripper 200 between the closed stable state and the open stable state, and that other configurations of the elastic connectors 270 may be used in other embodiments.

As discussed above, the bistable gripper 200 may be configured to provide an asymmetric force-displacement relationship, such that the magnitude of a first activation force required to switch the gripper 200 from the closed stable state to the open stable state is different from the magnitude of a second activation force required to switch the gripper 200 from the open stable state to the closed stable state. In some embodiments, the magnitude of the first activation force may be greater than the magnitude of the second activation force. In this manner, the bistable gripper 200 may be easy to switch from the open stable state to the closed stable state for grasping a perching object and also may maintain a stable grasp of the perching object until release therefrom is desired. To facilitate easy switching of the gripper 200 from the open stable state to the closed stable state, the second activation force may be selected to be small enough to be exerted by an aerial vehicle to which the gripper 200 is mounted. To provide a stable grasp of the perching object, the first activation force may be selected to be large enough to hold the weight of the aerial vehicle and the gripper 200. Mathematical models and techniques for configuring the gripper 200 to provide desired activation forces are provided below.

Characteristics of the gripper 200 may be selected and adjusted to accommodate aerial vehicles of different sizes and weights while satisfying the objectives of providing ease of switching the gripper 200 from the open stable state to the closed stable state and a stable hold of objects grasped by the gripper 200. First, the elastic connectors 270, which serve as compliant joints, can generate an asymmetric force-displacement relationship. As discussed above, the elastic connectors 270 may assume a natural state when the gripper 200 is in the closed stable state and a deformed state when the gripper 200 is in the open stable state. For example, the elastic connectors 270 may have a linear shape when in the natural state and a bent shape when in the deformed state. In this manner, the elastic connectors 270 may store strain energy when the gripper 200 is in the open stable state and release the stored strain energy when the gripper 200 is switched from the open stable state to the closed stable state, thereby requiring a smaller second activation force for switching the gripper 200 from the open stable state to the closed stable state. Second, the orientations of the beams 212 of the base 210 can be used to affect the magnitudes of the first activation force and the second activation force. For example, the tilt angle of the beams 212 relative to the vertical direction may be selected to provide desired magnitudes of the first activation force and the second activation force, without changing the other components of the gripper 200. It will be appreciated that other changes to the components and/or features of the gripper 200 may be made to provide a desired asymmetric force-displacement relationship.

Figure 2D:
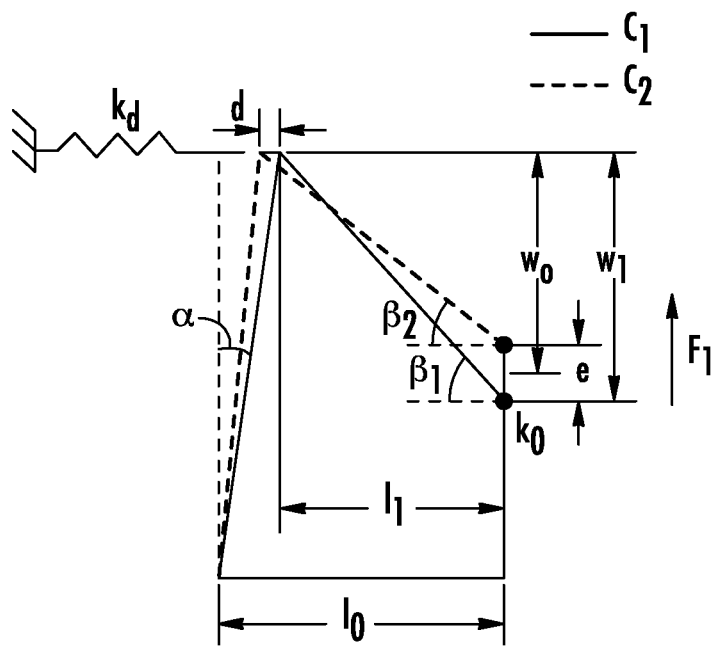
FIG. 2D is a schematic diagram illustrating a mathematical model for a portion of the gripper of FIG. 2A, showing the portion in the closed stable state and a state of transition.

For the bistable gripper 200, successful transitions between the closed stable state and the open stable state require application of the respective activation forces, which can be determined from the force-displacement relationship of the gripper 200. The activation forces will depend, at least in part, on certain parameters of the bistable gripper 200 described herein with reference to FIGS. 2C and 2D. FIG. 2C shows one branch of the gripper 200, including one of the beams 212, one of the transverse beams 214, the lower finger portion 232 of one of the fingers 230, the switching pad 250, and one of the elastic connectors 270. The left side of FIG. 2C illustrates the branch in an example closed stable state, while the right side of FIG. 2C illustrates the branch in an example open stable state. FIG. 2D illustrates a mathematical model for the branch of the gripper 200, showing the branch in the closed stable state and a state of transition after application of a force moving the branch from the closed stable state. Parameters affecting the activation forces for the gripper 200 include the length and Young's modulus of the beam 212, the length and Young's modulus of the elastic connector 270, the tilted angle $\alpha$ of the beam 212 with respect to the vertical direction, and the tilted angle ß for the arm 256 of the switching pad 250 to the elastic connector 270. Both the titled angle $\alpha$ and the tilted angle ß will influence the force-displacement relationship. To simplify the analysis, however, a constant tilted angle ß=ß$_0$ may be assumed. The tilted angle ß$_0$ may be selected as when the titled angle $\alpha$=0 and the elastic connector 270 has a linear shape in its natural state (i.e., no strain energy is stored in the elastic connector 270) at the closed stable state of the gripper 200.

To derive the force-displacement relationship, the analytic model of FIG. 2D may be used, where $C_1$ represents the closed stable state of the gripper 200 and $C_2$ represents a state of transition after application of a vertical force $F_1$ upward to move the gripper 200 from the closed stable state $C_1$. As shown, the beam 212 may be modeled as a linear spring with a spring constant $k_d$, and the elastic connector 270 may be modeled as a torsion spring with a spring constant $k_\theta$. It will be appreciated that with the tilted angle $\alpha \neq 0$ and the selection of ß$_0$, there is strain energy stored in the elastic connector 270 when the gripper 200 is in the closed stable state $C_1$. Assuming that the bending angles of the beam 212 are small enough, two additional assumptions may be made. First, the vertical distance $l_1$ from the joint to the fixed end of the beam 212 (i.e., the intersection of the beam 212 and the transverse beam 214) may be assumed to be consistent. Second, it may be assumed that the beam 212 is not bent when the gripper 200 is in the closed stable state $C_1$. Additional parameters shown in FIG. 2C include the length $l_2$ of the lower finger portion 232 from its free end to the center of the intersection between the lower finger portion 232 and the upper finger portion 234, and the length $l_{tube}$ of the elastic connector 270. Using these parameters, the distance $l_3$ from the center of the elastic connector 270 to the center of the joint may be determined from $l_3=(l_2+l_{tube}/2)$, and the horizontal distance $L_0$ from the center of the elastic connector 270 to the fixed end of the beam 212 may be determined from $L_0=l_3 \cos$ ß$_0$. The force-displacement relationship can be obtained by analyzing the movement of the gripper 200 from the closed stable state $C_1$ to the state of transition $C_2$ upon application of the force $F_1$ upward. FIG. 2D shows the vertical distance $w_1$ from the center of the elastic connector 270 to the linear spring and the angle ß$_1$ between the central axis of the lower finger portion 232 and the horizontal dashed line when the gripper 200 is in the closed stable state $C_1$. When the upward force $F_1$ is applied, the state of transition $C_2$ of the gripper 200 is achieved. The elastic connector 270 is moved upward according to the displacement e of the switching pad 250. Additionally, due to the elastic deformation of the beam 212, the joint is moved away from the central axis Ac of the gripper 200 by the displacement d. Further, the lower finger portion 232 pivots about the joint to a new position with the angle ß$_2$ between the central axis of the lower finger portion 232 and the horizontal dashed line.

Using the parameters discussed above, the force-displacement relationship can be derived from the principle of minimum potential energy (MPE). MPE shows that the total potential energy $E_t$ of a conservative structural system includes both the elastic strain energy $E_e$, which is stored in the deformed structure, and the work potential $E_w$ done by the applied force, as indicated in the following equation:

$$E_t = E_e + E_w$$

For moving the gripper 200 from the closed stable state $C_1$ to the state of transition $C_2$, this equation can be rewritten as:

$$E_t = \frac{1}{2}k_d d^2 + \frac{1}{2}k_\theta \Delta \beta_2^2 - \frac{1}{2}k_\theta \beta_1^2 - F_1 e$$
$$= \frac{1}{2}k_d d^2 + \frac{1}{2}k_\theta (\beta_2 - \beta_0)^2 - \frac{1}{2}k_\theta (\beta_1 - \beta_0)^2 - F_1 e$$

In FIG. 2D, the geometrical relationship shows:

$$\begin{cases} w_1^2 + L_1^2 = (w_1 - e)^2 + (L_1 + d)^2 \\ \beta_1 = \arctan \frac{w_1}{L_1} \\ \beta_2 = \arctan \frac{w_1 - e}{L_1 + d} \end{cases}$$

where:

$$\begin{cases} L_1 = L_0 - l_1 \sin\alpha = l_3 \cos\beta_0 - l_1 \sin\alpha \\ w_1 = \sqrt{l_3^2 - L_1^2} = \sqrt{l_3^2 - (l_3 \cos\beta_0 - l_1 \sin\alpha)^2} \end{cases}$$

The MPE also indicates the extremum of $E_t$ of is where the system will be stable. Thus, the stable configurations can be determined by setting $$\frac{\partial E_i}{\partial e} = 0$$

to finally obtain the force-displacement function:

$$F(e) = -\frac{3}{L_{f1}}\left[k_d(L_1 - L_{f1})(w_1 - e) + k_\theta\left(\arctan\left(\frac{w_1 - e}{L_{f1}}\right) - \beta_0\right)\right]$$

where $$L_{f1} = \sqrt{2w_1 e + L_1^2 - e^2} = L_1 + d.$$

Among these parameters, the distance $l_1$, the distance $l_3$, the angle $\beta_0$, the spring constant $k_d$, the spring constant $k_\theta$, and the angle $\alpha$ can be predefined, and the displacement e is variable. When e=0, $L_1$=$L_{f1}$, and thus there is no compression for the linear spring (i.e., no bending for the beam 212), and $$-\arctan\left(\frac{w_1 - e}{L_{f1}} - \beta_0\right) = -\arctan(\beta_1 - \beta_0) < 0,$$

meaning a downward force is generated from the elastic connector 270. This phenomenon can be explained with the previous assumption that at the closed stable state $C_1$, the beam 212 is not bent but the elastic connector 270 is bent slightly.

As discussed above, the gripper 200 may be configured to satisfy three objectives: easy to close, stable to hold, and easy to adjust. By simulating the force-displacement relationship, it was determined that the spring constant $k_\theta$ values can change the asymmetry effectively and influence the activation forces accordingly, while the spring constant $k_d$ only affects the amplitude of the activation forces. With appropriate combinations of the spring constant $k_d$ and the spring constant $k_\theta$, a small activation force to close the finger 230 and a large activation force to open the finger 230 can be determined. With tilted beams 212 (i.e., $\alpha \neq 0$), a configuration of the bistable gripper 200 with the same switching pad 250 but with the beams 212 of the base 210 having different tilted angles can be designed to satisfy the objectives.

Without a design method, different values of the spring constant $k_d$ and the spring constant $k_\theta$ can be tried, and the resulting activation forces can be checked to determine whether they are desirable or not. To design a configuration of the bistable gripper 200 with specific activation forces, the following design guideline may be used. For the force-displacement relationship equation F(e), if the gripper mechanism is bistable, F(e) should have two extremes. Thus, we have:

$$\begin{cases} F(e_1) = F_{max} \\ F(e_2) = F_{min} \\ F'(e_1) = 0 \\ F'(e_2) = 0 \end{cases}$$

where $e_1$ and $e_2$ are the displacements corresponding to the two stable configurations. In determining the appropriate values of the spring constant $k_d$ and the spring constant $k_\theta$ to achieve the desired activation forces, there are four unknowns (the displacement $e_1$, the displacement $e_2$, the spring constant $k_d$, and the spring constant $k_\theta$) and four equations. Thus, the four unknowns can be solved. Similarly, if the spring constant $k_d$ and the spring constant $k_\theta$ are predefined, the gripper mechanism dimensions (i.e., the distance $l_1$, the distance $l_2$, and the angle $\alpha$) can be determined so that the desired activation forces can be achieved.

In some instances, the spring constant $k_d$ and the spring constant $k_\theta$ may be set as design variables, and the other parameters may be predefined. Because $k_d \approx Ea^4/4l_1$, where E is the Young's modulus of the beam 212, a is the length of the square cross-section area of the beam 212, and ii is the length of the beam 212, appropriate dimensions of the beams 212 can be determined to achieve the desired activation forces.

As discussed above with reference to FIG. 2C, the initial state of the gripper 200 may be the closed stable state. In the initial state, there is no force applied to the beams 212 and the elastic connectors 270 except the force of gravity. When the gripper 200 is in the open stable state, there is strain energy stored in both the beams 212 and the elastic connectors 270. Thus, it is easier to change the open stable state than the closed stable state. During use of the bistable gripper 200, after the gripper 200 is switched to the closed stable state, the upper finger portions 234 of the fingers 230 will hold the weight of the gripper 200 and the aerial vehicle 202. As long as the force of gravity for the whole system is less than the opening activation force, the closed stable state can be maintained. It can be shown that the force of gravity acting at the tips of the upper finger portions 234 has the same effect as the force acting on the switching pad 250. Both forces have the same torque on the joints.

Various possible techniques may be used to switch the bistable gripper 200 from the closed stable state to the open stable state when the gripper 200 is mounted to the aerial vehicle 202 and grasping a perching object. In some embodiments, the aerial vehicle 202 may be operated to generate a downward thrust to switch the bistable gripper 200 from the closed stable state to the open stable state. If a sum of the thrust force and the weight of the system is greater than the opening activation force, the gripper 200 can be switched from the closed stable state to the open stable state. In some embodiments, the bistable gripper 200 may include a releasing mechanism configured for switching the bistable gripper 200 from the closed stable state to the open stable state. In some embodiments, as shown in FIG. 2B, a releasing mechanism 280 may include one or more resistance wires 282 and a motor driver 284. The resistance wires 282 may be wrapped around the upper finger portion 234 of one or more of the fingers 230. According to embodiments in which the fingers 230 are formed of a thermoplastic material, heating up of the resistance wires 282 via the motor driver 284 may cause the upper finger portions 234 to soften, which may cause the fingers 230 to open. Still other techniques may be used to switch the bistable gripper 200 from the closed stable state to the open stable state in other embodiments.

The following describes fabrication of different configurations of the bistable gripper 200, simulation of force-displacement relationships, and experimental testing to determine activation forces. Three different configurations of the gripper 200 were fabricated. Relevant parameters for the three configurations are listed in Table 1.

TABLE 1

| Parameters | $G_0$ | $G_{c1}$ | $G_{c2}$ |
|---|---|---|---|
| α (°) | 0 | 2.5 | 5 |
| $F_{max}$ (N) | 0.8 | 1.33 | 1.95 |
| $F_{min}$ (N) | −0.6 | −1.1 | −1.72 |

As described above, the fabricated configurations of the grippers 200 included the base 210 having three of the beams 212, three of the fingers 230, the switching pad 250, and three of the elastic connectors 270. The base 210, the fingers 230, and the switching pad 250 were formed of PLA by three-dimensional printing using a PRUSA I3 MK3 printer. For the fingers 230, the lower finger portions 232 and the upper finger portions 234 were separately formed and then glued to one another. The elastic connectors 270 were formed as tubes made of silicone rubber, with each tube having an inner diameter of 1 mm and an outer diameter of 3 mm.

Using the design guideline discussed above, the ideal activation forces were selected to be an opening activation force of 0.8 N and a closing activation force of −0.6 N. The force-displacement equations were then solved in MATLAB using a built-in function "vpasolve" with other predefined parameters. Solutions of the equations resulted in the ideal linear spring constant $k_d$ of 590 Nm and the ideal torsion spring constant $k_θ$ of $1.5 \times 10^{-3}$ Nm/rad. The, the following equation was used to determine dimensions of the beam 212 and the elastic connector 270:

$$k_d = \frac{3E_1 I_1}{l_1^3}, k_θ = \frac{E_2 I_2}{l_{tube}}$$

where $I_1$ is the second moment of inertia of the beam 212, $I_2$ is the second moment of inertia of the elastic connector 270, $E_1$ is the Young's modulus of the beam 212, and $E_2$ is the Young's modulus of the elastic connector 270. Using this equation, $l_1$ was determined to be 22 mm, a was determined to be 2 mm, and $l_{tube}$ was determined to be 5 mm. With these parameters, the actual linear spring constant $k_d$ was 526 Nm and the actual torsion spring constant $k_θ$ was $1.2 \times 10^{-3}$ Nm/rad. For the three configurations of the gripper 200, the angle α was varied. Specifically, the first configuration $G_0$ had an angle α of 0 degrees, the second configuration $G_1$ had an angle α of 2.5 degrees, and the third configuration $G_2$ had an angle α of 5 degrees. As shown in Table 1, the first configuration $G_0$ had an ideal opening activation force of 0.8 N and an ideal closing activation force of −0.6 N, the second configuration $G_1$ had an ideal opening activation force of 1.33 N and an ideal closing activation force of −1.1 N, and the third configuration $G_2$ had an ideal opening activation force of 1.95 N and an ideal closing activation force of −1.72 N.

Figure 2E:
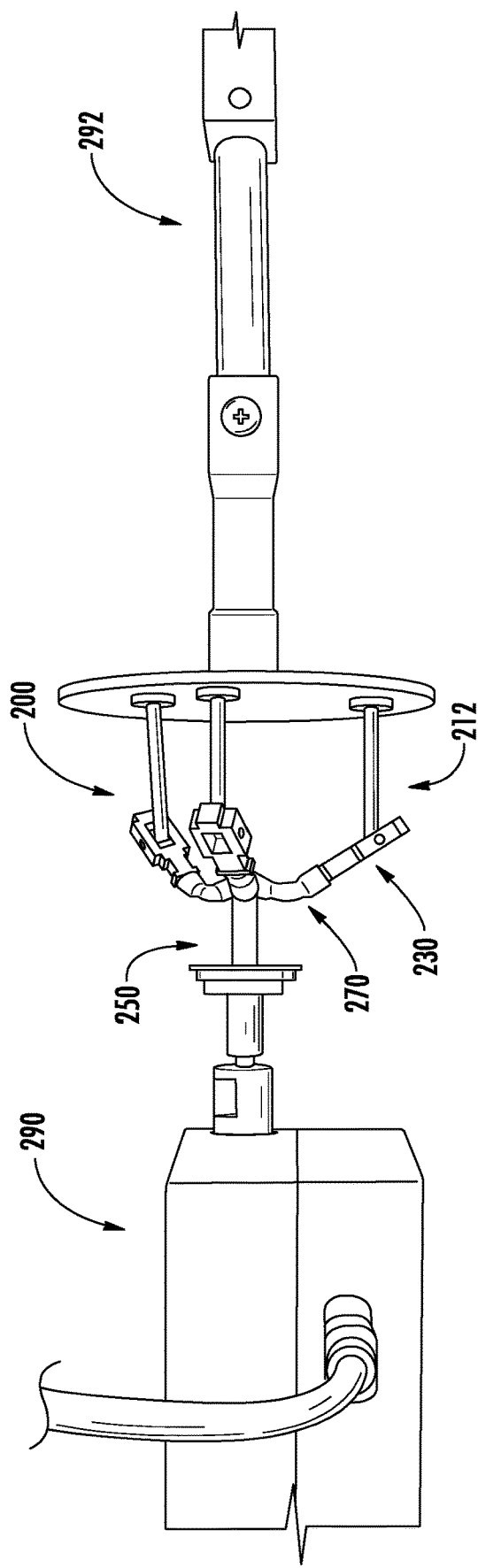
FIG. 2E is a perspective view of a test setup for determining activation forces for the gripper of FIG. 2A in accordance with one or more embodiments of the disclosure.

Experimental testing was conducted to determine the actual activation forces for the different configurations of the gripper 200, allowing determination of the accuracy of the force-displacement characteristics and the effectiveness of the design guideline. The experimental setup is shown in FIG. 2E, which includes a force gauge 290 and a linear actuator 292. For the testing, the base 210 of the gripper 200 was provided with a disk to stabilize the base 210 with respect to the tip of the linear actuator 292 and avoid twisting motion of the elastic connectors 270. The switching pad 250 was glued to the tip of the force gauge (M3-5 from MARK-10). The linear actuator 292 was moved backward (to determine the opening activation force) or forward (to determine the closing activation force) with a constant speed of 2 mm/s. At the same time, the force was recorded. For each of the gripper configurations, three experiments were conducted for each of the opening activation force and the closing activation force. The mean activation forces and error for each of the gripper configurations are listed in Table 2.

TABLE 2

| Measurements | $G_0$ | $G_{c1}$ | $G_{c2}$ |
|---|---|---|---|
| $F_{max}$ (N) | 1.01 | 1.43 | 2.04 |
| $F_{min}$ (N) | 0.69 | 1.11 | 1.75 |
| $e_{max}$ (%) | 26.25 | 7.52 | 4.62 |
| $e_{min}$ (%) | 15 | 0.9 | 1.74 |

The experimental data shows that the proposed activation force estimation method is accurate especially when the absolute forces are large. This is because the moments caused by the elastic connectors 270 have much less influence than that of the beams 212 when the beams 212 are initially tilted. Additionally, during the experiments, the elastic connectors 270 are also deformed, which influences the results especially when the force from the deformation of the beams 212 is small.

With the force-displacement characteristics, a configuration of the gripper 200 with the desired activation forces can be designed for different aerial vehicles. Experimental perching testing was conducted with a version of the gripper 200 configured for use with the CRAZYFLIE aerial vehicle, which had a maximum thrust of 57 g. With the bistable gripper 200 mounted to the CRAZYFLIE, as shown in FIG. 2B, the total weight of the system was 36 g, meaning that an extra 21 g of thrust was provided. For this testing, the gripper 200 was designed with an opening activation force of 0.48 N and a closing activation force of −0.1 N. The gripper 200 was mounted on the top of the CRAZYFLIE, as shown in FIG. 2B. The resistance wires 282 were wrapped around the upper finger portions 234 of the fingers 230, and the motor driver 284 (DRV8835 from POLOLU) was used to switch on the resistance wires 282. With current going through, the upper finger portions 234 would soften, allowing the CRAZYFLIE to be released from a perching object. In the perching experiment, the CRAZYFLIE was controlled manually to elevate towards a hanger, and the gripper 200 was closed using the spare thrust. After switching from the open stable state to the closed stable state, the upper finger portions 234 held together for perching the CRAZYFLIE on the hanger. When the CRAZYFLIE received a take-off signal, it enabled the motor driver 284 to apply current to the resistance wires 282. After releasing, the motor driver 284 was immediately turned off. The testing showed that the gripper 200 can be used to achieve successful perching and taking off.

Although, the bistable gripper 200 has been described above as being used to facilitate perching of an aerial vehicle, the gripper 200 alternatively may be used to facilitate carrying of a payload with an aerial vehicle. For example, the gripper 200 may be mounted to the bottom of an aerial vehicle, such as the aerial vehicle 202, and switched between the closed stable state and the open stable state for grasping and releasing a payload. Further uses of the bistable gripper 200 with aerial vehicles or other types of devices will be appreciated by one skilled in the art in view of the teachings provided herein.

Figure 3A:
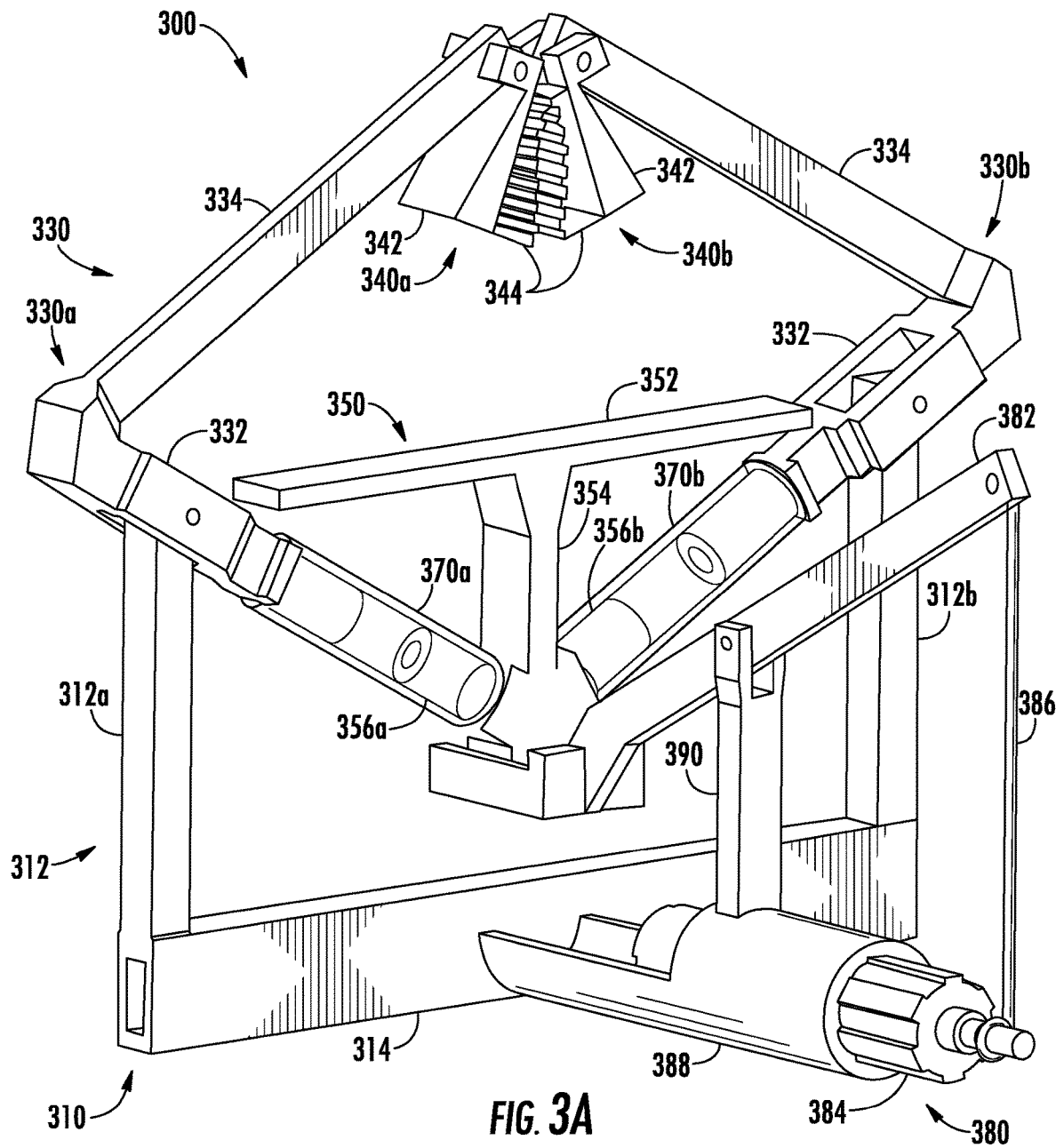
FIG. 3A is a perspective view of a gripper in accordance with one or more embodiments of the disclosure, showing a plurality of beams, a plurality of fingers, a switching pad, a plurality of elastic connectors, a plurality of feet, and a motor-driven lever mechanism of the gripper, with the gripper in a closed stable state.
Figure 3B:
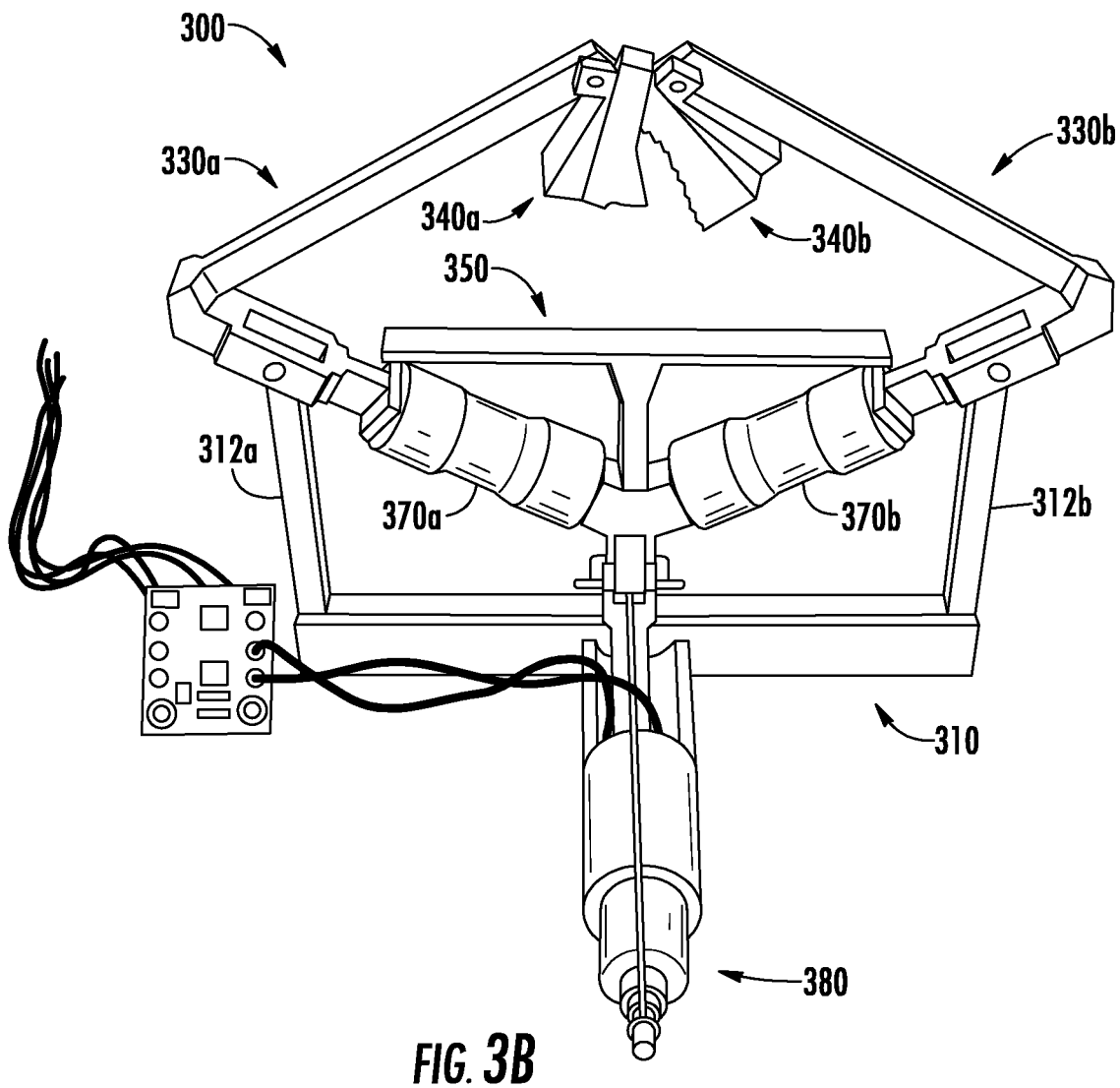
FIG. 3B is a perspective view of the gripper of FIG. 3A, showing the gripper in the closed stable state.
Figure 3C:
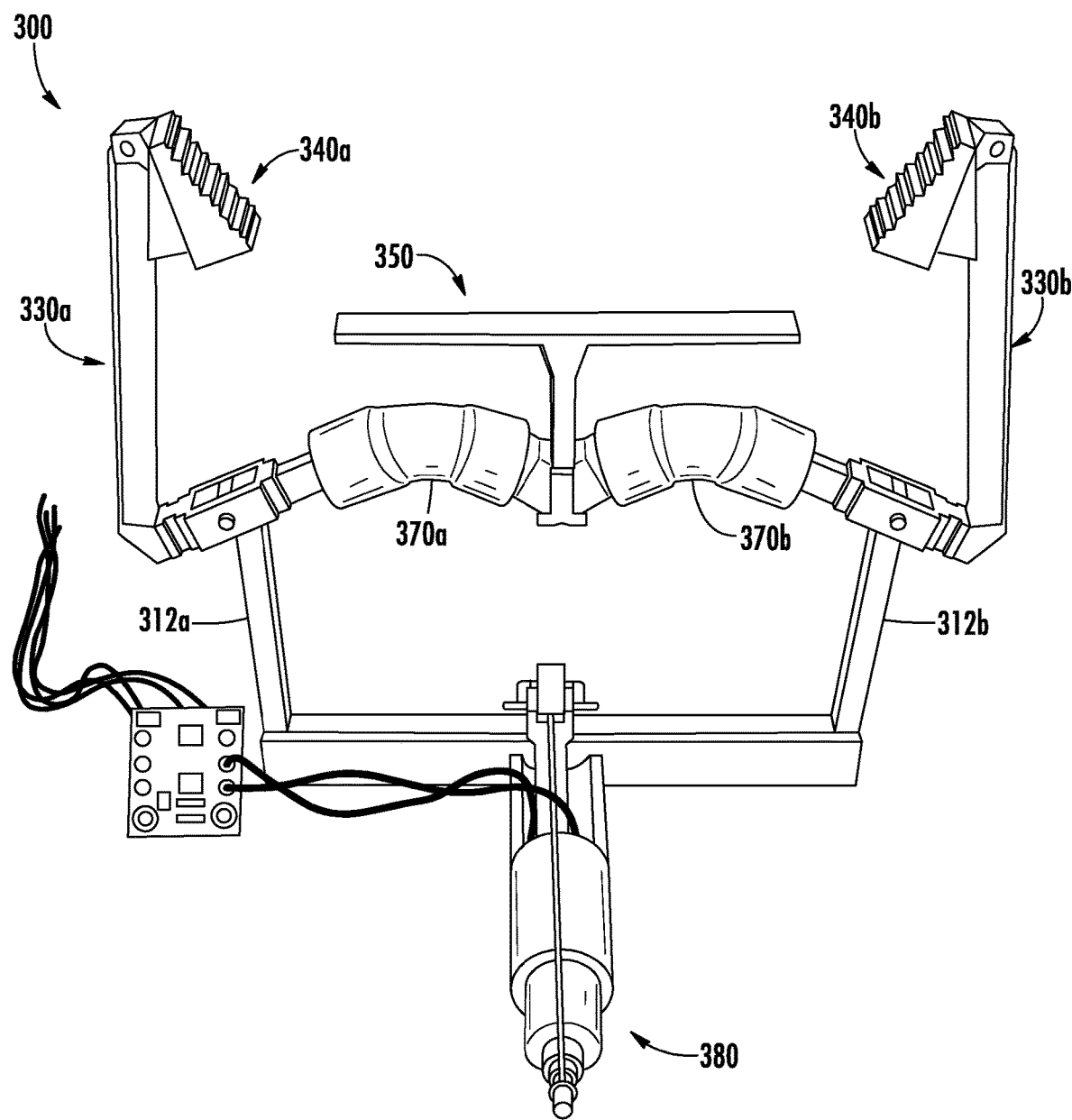
FIG. 3C is a perspective view of the gripper of FIG. 3A, showing the gripper in an open stable state.
Figure 3D:
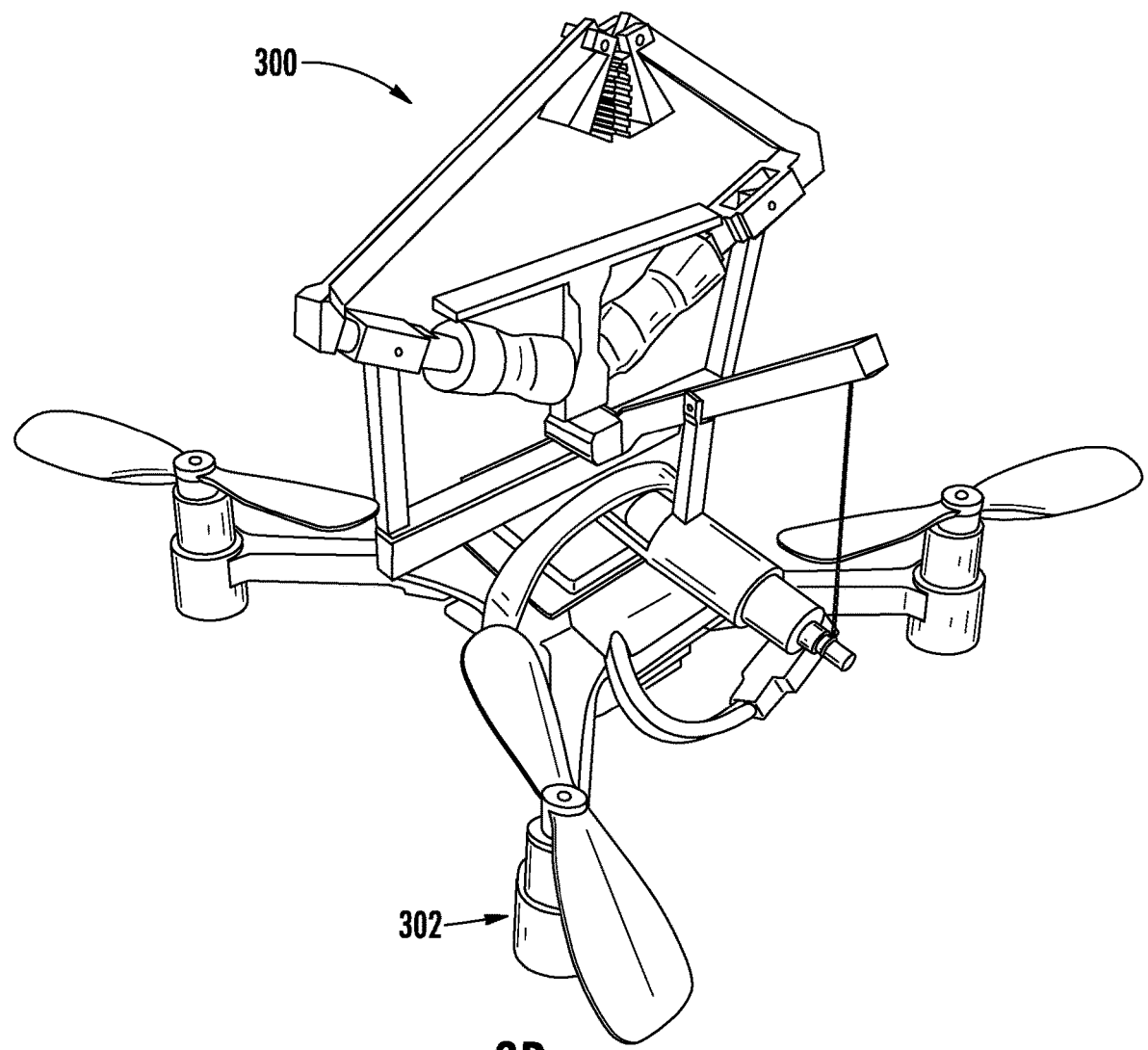
FIG. 3D is a perspective view of the gripper of FIG. 3A mounted to an aerial vehicle in accordance with one or more embodiments of the disclosure, showing the gripper in the closed stable state.
Figure 3E:
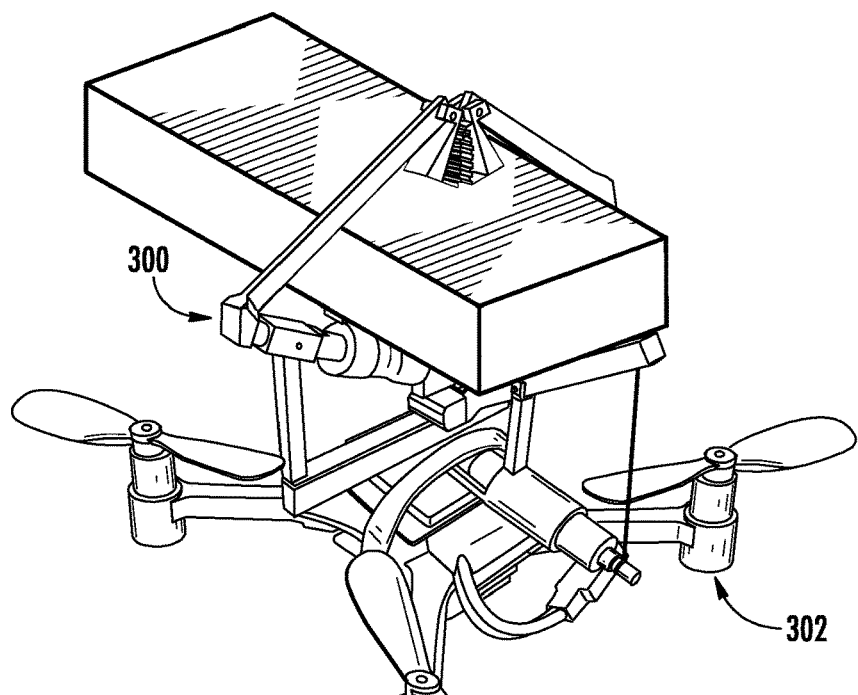
FIG. 3E is a perspective view of the gripper of FIG. 3A being used for perching the aerial vehicle on an object via an encircling method.
Figure 3F:
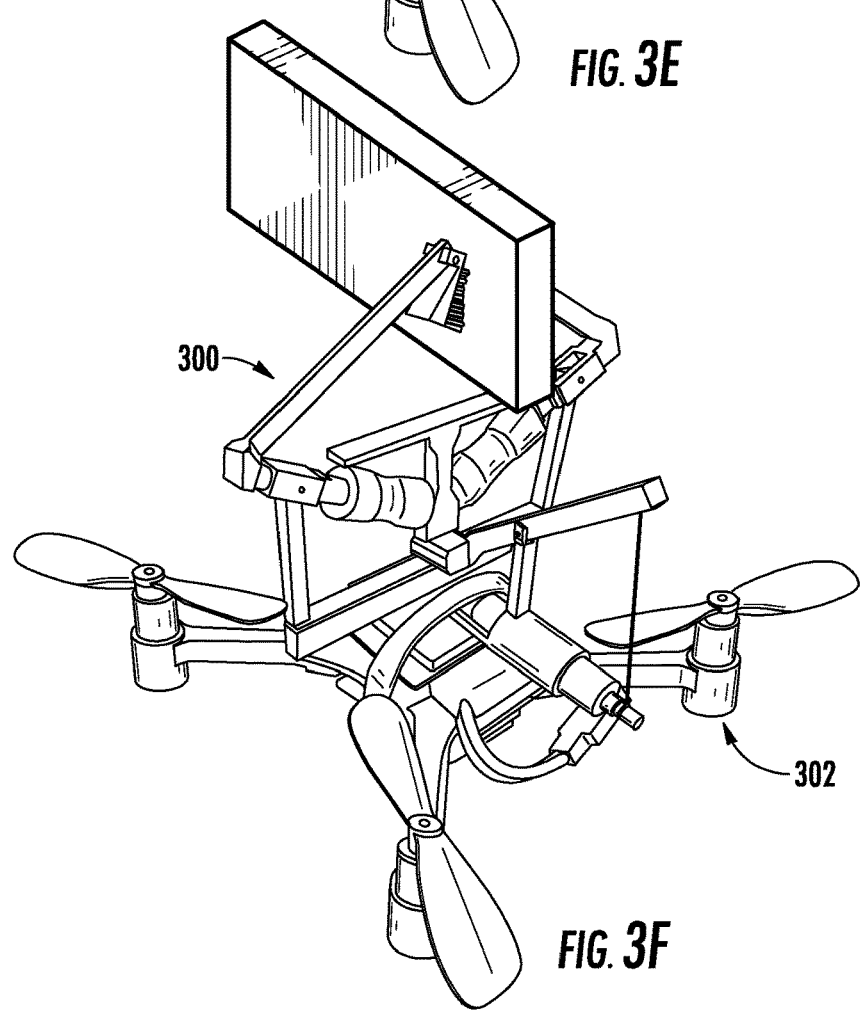
FIG. 3F is a perspective view of the gripper of FIG. 3A being used for perching the aerial vehicle on an object via a clipping method.
Figure 3G:
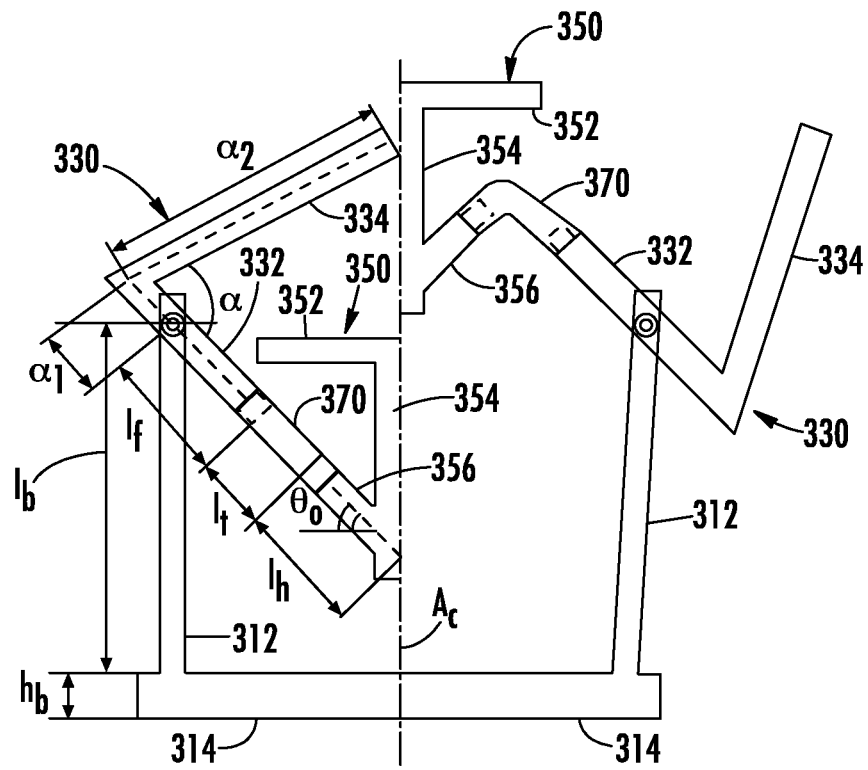
FIG. 3G is a schematic diagram of the gripper of FIG. 3A, showing the gripper in the closed stable state (left side) and the open stable state (right side).

FIGS. 3A-3G illustrate another example bistable gripper 300 (which also may be referred to simply as a "gripper") in accordance with one or more embodiments of the disclosure. Certain similarities and differences between the bistable gripper 300 and the bistable gripper 200 described above will be appreciated from the following description and the corresponding drawings. The bistable gripper 300 may be configured for switching between a closed stable state and an open stable state. FIGS. 3A and 3B show the bistable gripper 300 in an example closed stable state, while FIG. 3C shows the gripper 300 in an example open stable state. As described below, the bistable gripper 300 may be used with an aerial vehicle to facilitate aerial perching and grasping. For example, the bistable gripper 300 may be mounted to an aerial vehicle 302, as shown in FIG. 3D, to allow for perching of the aerial vehicle 302 on a perching object. FIG. 3E shows the gripper 300 being used for perching of the aerial vehicle 302 using an encircling method. FIG. 3F shows the gripper 300 being used for perching of the aerial vehicle 302 using a clipping method. FIG. 3G shows a portion of the bistable gripper 300 in an example closed stable state (left side) and an example open stable state (right side). According to the illustrated embodiment, the bistable gripper 300 may include a base 310, a plurality of fingers 330, a plurality of feet 340, a switching pad 350, a plurality of elastic connectors 370, and a motor-driven lever mechanism 380. It will be appreciated that alternative configurations and arrangements of the illustrated components and/or features thereof may be used in other embodiments of the bistable gripper 300. Further, in certain embodiments, one or more of the illustrated components and/or features may be omitted, and additional components and/or features may be provided as part of the bistable gripper 300.

The base 310 may provide a support structure for the remaining components of the bistable gripper 300 and may facilitate attachment of the gripper 300 to an aerial vehicle. The base 310 may include a plurality of beams 312 spaced apart from one another. As shown, the base 310 may include a first beam 312a and a second beam 312b spaced apart from one another and arranged at equal distances from the central axis Ac of the bistable gripper 300. Although the illustrated embodiment is provided with two beams 312, any number of the beams 312, such as three, four, five, six, or more, may be used in other embodiments. As shown, each of the beams 312 may be formed as an elongated member extending vertically. In some embodiments, each of the beams 312 may have a linear shape. In other embodiments, each of the beams 312 may have a non-linear shape, such as a curved or otherwise contoured shape. In some embodiments, the shape and dimensions of the beams 312 may be identical to one another. The base 310 also may include one or more structures connecting the beams 312. For example, the base 310 may include a transverse beam 314 extending between the beams 312. As shown, the transverse beam 314 may be connected to the first beam 312a and the second beam 312b and extend cross the central axis Ac of the bistable gripper 300. The beams 312 may be fixedly attached to the transverse beam 314. In some embodiments, the beams 312 and the transverse beam 314 may be integrally formed with one another, such that the base 310 is provided as a unitary component. In other embodiments, the beams 312 and the transverse beam 314 may be separately formed and then fixedly attached to one another. In some embodiments, other types of structures, such as a plate, a disk, or a web, may be used for connecting the beams 312 to define their spaced apart arrangement. In some embodiments, the base 310 may be formed of a thermoplastic material, such as PLA, PET, or PETG, although other suitable materials may be used in other embodiments. In some embodiments, the base 310 may be formed by additive manufacturing, such as three-dimensional printing, although other suitable techniques may be used.

Each of the beams 312 may be configured for elastically deforming when the bistable gripper 300 is switched from the closed stable state to the open stable state. For example, the beams 312 may be configured for elastically bending when the bistable gripper 300 is switched from the closed stable state to the open stable state. Each of the beams 312 may be configured for assuming a first state when the bistable gripper 300 is in the closed stable state and a different second state when the gripper 300 is in the open stable state. In this manner, each of the beams 312 may be configured for elastically deforming from the first state to the second state when the bistable gripper 300 is switched from the closed stable state to the open stable state. Further, each of the beams 312 may be configured for returning from the second state to the first state when the bistable gripper 300 is switched from the open stable state to the closed stable state. In some embodiments, for each of the beams 312, the first state may be a natural state (i.e., a state of the beam 312 absent application of external forces), and the second state may be a deformed state (i.e., a state of the beam 312 in which the beam 312 is deformed from the natural state due to application of an external force). In view of the elastic deformation of the beams 312, each of the beams 312 may be configured for storing potential energy and releasing the stored energy during use of the bistable gripper 300. For example, each of the beams 312 may be configured for storing strain energy when the bistable gripper 300 is in the open stable state and for releasing the stored strain energy when the gripper 300 is switched from the open stable state to the closed stable state.

In some embodiments, as shown, the beams 312 may be configured for elastically deforming away from the central axis Ac and one another when the bistable gripper 300 is switched from the closed stable state to the open stable state and for returning toward the central axis Ac and one another when the gripper 300 is switched from the open stable state to the closed stable state. In some embodiments, as shown, each of the beams 312 may extend parallel to the central axis Ac when in the first state (i.e., when the gripper 300 is in the closed stable state), and each of the beams 312 may be angled away from the central axis Ac when in the second state (i.e., when the gripper 200 is in the open stable state). In other embodiments, each of the beams 312 may be angled toward the central axis Ac when in the first state, and each of the beams 312 may extend parallel to or be angled away from the central axis Ac when in the second state. It will be appreciated that the illustrated embodiment provides merely an example configuration of the beams 312 and their movement between the first state and the second state upon switching of the gripper 300 between the closed stable state and the open stable state, and that other configurations of the beams 312 may be used in other embodiments.

The fingers 330 may be pivotably attached to the beams 312 at respective joints. As shown, the bistable gripper 300 may include a first finger 330a pivotably attached to the first beam 312a at a first joint, and a second finger 330b pivotably attached to the second beam 312b at a second joint. Although the illustrated embodiment is provided with two fingers 330, any number of the fingers 330, such as three, four, five, six, or more, may be used in other embodiments. The number of the fingers 330 may correspond to the number of the beams 312 of the bistable gripper 300. As shown, each of the fingers 330 may include a lower finger portion 332 and an upper finger portion 334 fixedly attached to one another. In some embodiments, as shown, the lower finger portion 332 and the upper finger portion 334 may be formed as elongated members that are angled relative to one another to define an acute angle therebetween. In some embodiments, each of the lower finger portion 332 and the upper finger portion 334 may have a linear shape. In other embodiments, one or both of the lower finger portion 332 and the upper finger portion 334 may have a non-linear shape, such as a curved or otherwise contoured shape. In some embodiments, the lower finger portion 332 and the upper finger portion 334 may be integrally formed with one another, such that each of the fingers 330 is provided as a unitary component. In other embodiments, the lower finger portion 332 and the upper finger portion 334 may be separately formed and then fixedly attached to one another. In some embodiments, the shape and dimensions of the fingers 330 may be identical to one another. In some embodiments, the fingers 330 may be configured for inhibiting deformation of the fingers 330 during use of the bistable gripper 300. For example, the dimensions, features, and material of the fingers 330 may be selected to inhibit deformation of the fingers 330. In some embodiments, the fingers 330 may be formed of a thermoplastic material, such as PLA, PET, or PETG, although other suitable materials may be used in other embodiments. In some embodiments, the fingers 330 may be formed by additive manufacturing, such as three-dimensional printing, although other suitable techniques may be used.

The fingers 330 may be configured for pivoting relative to the respective beams 312 about the respective joints when the bistable gripper 300 is switched between the closed stable state and the open stable state. Each of the fingers 330 may be configured for assuming a first position when the bistable gripper 300 is in the closed stable state and a different second position when the gripper 300 is in the open stable state. In this manner, each of the fingers 330 may be configured for pivoting about the respective joint from the first position to the second position when the bistable gripper 300 is switched from the closed stable state to the open stable state. Further, each of the fingers 330 may be configured for pivoting about the respective joint from the second position to the first position when the bistable gripper 300 is switched from the open stable state to the closed stable state. In some embodiments, as shown, the lower finger portions 332 of the fingers 330 may be pivotably attached to the respective beams 312 at the respective joints. In other embodiments, the upper finger portions 334 of the fingers 330 may be pivotably attached to the respective beams 312 at the respective joints.

In some embodiments, as shown, the fingers 330 may be configured for pivoting such that the upper finger portions 334 move away from the central axis Ac and one another when the gripper 300 is switched from the closed stable state to the open stable state and such that the upper finger portions 334 move toward the central axis Ac and one another when the gripper 300 is switched from the open stable state to the closed stable state. In this manner, the fingers 330 collectively may have a first closed configuration when the gripper 300 is in the closed stable state and a second open configuration when the gripper 300 is in the open stable state. The open configuration of the fingers 330 may be suitable for positioning the fingers 330 at least partially around an object, such as a perching object, for grasping and releasing the object, while the closed configuration of the fingers 330 may be suitable for maintaining a grasp of the object. In some embodiments, as shown, the joints between the fingers 330 and the beams 312 may be pin joints. Other types of joints for pivotably attaching the fingers 330 and the beams 312 and allowing pivoting of the fingers 330 may be used in other embodiments. It will be appreciated that the illustrated embodiment provides merely an example configuration of the fingers 330 and their movement between the first position and the second position upon switching of the gripper 300 between the closed stable state and the open stable state, and that other configurations of the fingers 330 may be used in other embodiments.

The feet 340 may be pivotably attached to the fingers 330 at respective joints. As shown, the bistable gripper 300 may include a first foot 340a pivotably attached to the first finger 330a at a first joint, and a second foot 340b pivotably attached to the second finger 330b at a second joint. Although the illustrated embodiment is provided with two feet 340, any number of the feet 340, such as three, four, five, six, or more, may be used in other embodiments. The number of the feet 340 may correspond to the number of the fingers 330 of the bistable gripper 300. As shown, each of the feet 340 may be pivotably attached to the respective finger 330 at or near the free end of the upper finger portion 334 of the respective finger 330. In this manner, the feet 340 may be configured for contacting a perching object when the clipping method of perching is used, as shown in FIG. 3F. As shown, each of the feet 340 may include a rigid base portion 342 and an elastomeric portion 344 attached to one another. The rigid base portion 342 may provide structural support and rigidity for the foot 340, while the elastomeric portion 344 may be configured for contacting and frictionally engaging a perching object. The rigid base portion 342 and the elastomeric portion 344 may be separately formed and fixedly attached to one another, for example, via an adhesive. In some embodiments, the rigid base portion 342 may be formed of a thermoplastic material, such as PLA, PET, or PETG, although other suitable materials may be used in other embodiments. In some embodiments, the rigid base portion 342 may be formed by additive manufacturing, such as three-dimensional printing, although other suitable techniques may be used. The elastomeric portion 344 may be formed of one or more elastomeric materials.

The feet 340 may be configured for pivoting relative to the respective fingers 330 about the respective joints when the feet 340 contact a perching object. In some embodiments, as shown, the feet 340 may be configured for pivoting freely about the respective joints to accommodate the shape of a mating surface of the perching object. In other words, the pivoted position of each foot 340 may be determined by the mating surface of the perching object. In some embodiments, as shown, the joints between the feet 340 and the fingers 330 may be pin joints. Other types of joints for pivotably attaching the feet 340 and the fingers 330 and allowing pivoting of the feet 340 may be used in other embodiments. It will be appreciated that the illustrated embodiment provides merely an example configuration of the feet 340 and their movement relative to the fingers 330 to facilitate perching using the clipping method, and that other configurations of the feet 340 may be used in other embodiments.

The switching pad 350 (which also may be referred to as a "contact pad") may be configured for moving relative to the base 310 when the bistable gripper 300 is switched between the closed stable state and the open stable state. For example, the switching pad 350 may be configured for translating relative to the base 310 between a first position and a second position when the gripper 300 is switched between the closed stable state and the open stable state. As shown, the switching pad 350 may be configured for translating in a first direction from the first position to the second position when the gripper 300 is switched from the closed stable state to the open stable state and for translating in an opposite second direction from the second position to the first position when the gripper 300 is switched from the open stable state to the closed stable state. As described further below, movement of the switching pad 350 between the first position and the second position may facilitate switching of the bistable gripper 300 between the closed stable state and the open stable state.

In some embodiments, as shown, the switching pad 350 may include a platform 352, a support 354, and a plurality of arms 356. The platform 352 may be configured for contacting an object, such as a perching object, to facilitate movement of the switching pad 350 from the second position to the first position and switching of the bistable gripper 300 from the open stable state to the closed stable state. In some embodiments, the platform 352 may be formed as a plate, such as an elongated plate, although other configurations and shapes of the platform 352 may be used in other embodiments. The platform 352 may include a top surface configured for contacting objects. In some embodiments, as shown, the top surface may be a planar surface, although a curved or otherwise contoured top surface may be used in other embodiments. The support 354 may be configured for supporting the platform 352 and transferring forces applied to the platform 352 to other components of the bistable gripper 300, as described below, to facilitate switching of the gripper 300 from the open stable state to the closed stable state. In some embodiments, the support 354 may be formed as an elongated member extending downward from the platform 352, although other configurations and shapes of the support 354 may be used in other embodiments. In some embodiments, as shown, the switching pad 350 may be centered on the central axis Ac, with the support 354 extending along the central axis Ac, although other positions of the support 354 and the overall switching pad 350 may be used in other embodiments.

The arms 356 may be configured for attaching the elastic connectors 370 to the switching pad 350. As shown, the switching pad 350 may include a first arm 356a and a second arm 356b. Although the illustrated embodiment is provided with two arms 356, any number of the arms 356, such as three, four, five, six, or more, may be used in other embodiments. The number of the arms 356 may correspond to the number of the elastic connectors 370 of the bistable gripper 300. As shown, each of the arms 356 may extend outward from the support 354. In some embodiments, as shown, each of the arms 356 may be angled relative to the support 354 to define an acute angle therebetween. In some embodiments, the platform 352, the support 354, and the arms 356 may be integrally formed with one another, such that the switching pad 350 is provided as a unitary component. In other embodiments, two or more of the platform 352, the support 354, and the arms 356 may be separately formed and then fixedly attached to one another. In some embodiments, the switching pad 350 may be configured for inhibiting deformation of the switching pad 350 during use of the bistable gripper 300. For example, the dimensions, features, and material of the switching pad 350 may be selected to inhibit deformation of the switching pad 350. In some embodiments, the switching pad 350 may be formed of a thermoplastic material, such as PLA, PET, or PETG, although other suitable materials may be used in other embodiments. In some embodiments, the switching pad 350 may be formed by additive manufacturing, such as three-dimensional printing, although other suitable techniques may be used. It will be appreciated that the illustrated embodiment provides merely an example configuration of the switching pad 350 and its movement between the first position and the second position upon switching of the gripper 300 between the closed stable state and the open stable state, and that other configurations of the switching pad 350 may be used in other embodiments.

The elastic connectors 370 may be attached to the switching pad 350 and the respective fingers 330. As shown, the bistable gripper 300 may include a first elastic connector 370a attached to the first arm 356a of the switching pad 350 and the first finger 330a, and a second elastic connector 370b attached to the second arm 356b of the switching pad 350 and the second finger 330b. Although the illustrated embodiment is provided with two elastic connectors 370, any number of the elastic connectors 370, such as three, four, five, six, or more, may be used in other embodiments. The number of the elastic connectors 370 may correspond to the number of the fingers 330. As shown, each of the elastic connectors 370 may be formed as an elongated member extending from the respective arm 356 of the switching pad 350 to the lower finger portion 332 of the respective finger 330. In some embodiments, as shown, each of the elastic connectors 370 may be formed as a hollow member, such as a tube. In other embodiments, each of the elastic connectors 370 may be formed as a solid member, such as a rod or a band. In some embodiments, each of the elastic connectors 370 may have a linear shape. In other embodiments, each of the elastic connectors 370 may have a non-linear shape, such as a curved or otherwise contoured shape. In some embodiments, the shape and dimensions of the elastic connectors 370 may be identical to one another. In some embodiments, the elastic connectors 370 may be formed of silicone, although other suitable elastic materials may be used in other embodiments. In some embodiments, as shown, each of the elastic connectors 370 may be attached to the switching pad 350 and the respective finger 330 by a first end portion of the connector 370 being mated over a free end portion of the respective arm 356 of the switching pad 350 and a second end portion of the connector 370 being mated over a free end portion of the lower finger portion 332 of the respective finger 330. In other embodiments, each of the elastic connectors 370 may be attached to the switching pad 350 and the respective finger 330 by a first end portion of the connector 370 being mated within a free end portion of the respective arm 356 of the switching pad 350 and a second end portion of the connector 370 being mated within a free end portion of the lower finger portion 332 of the respective finger 330. Still other means for attaching the elastic connectors 370 to the switching pad 350 and the fingers 330, such as fasteners or adhesives, may be used. In some embodiments, the elastic connectors 370 may be fixedly attached to the switching pad 350 and the respective fingers 330. In other embodiments, the elastic connectors 370 may be removably attached to the switching pad 350 and the respective fingers 330.

Each of the elastic connectors 370 may be configured for elastically deforming when the bistable gripper 300 is switched from the closed stable state to the open stable state. For example, the elastic connectors 370 may be configured for elastically bending when the bistable gripper 300 is switched from the closed stable state to the open stable state. Each of the elastic connectors 370 may be configured for assuming a first state when the bistable gripper 300 is in the closed stable state and a different second state when the gripper 300 is in the open stable state. In this manner, each of the elastic connectors 370 may be configured for elastically deforming from the first state to the second state when the bistable gripper 300 is switched from the closed stable state to the open stable state. Further, each of the elastic connectors 370 may be configured for returning from the second state to the first state when the bistable gripper 300 is switched from the open stable state to the closed stable state. In some embodiments, for each of the elastic connectors 370, the first state may be a natural state (i.e., a state of the elastic connector 370 absent application of external forces), and the second state may be a deformed state (i.e., a state of the elastic connector 370 in which the elastic connector 370 is deformed from the natural state due to application of an external force). In view of the elastic deformation of the elastic connectors 370, each of the elastic connectors 370 may be configured for storing potential energy and releasing the stored energy during use of the bistable gripper 300. For example, each of the elastic connectors 370 may be configured for storing strain energy when the bistable gripper 300 is in the open stable state and for releasing the stored strain energy when the gripper 300 is switched from the open stable state to the closed stable state. It will be appreciated that the illustrated embodiment provides merely an example configuration of the elastic connectors 370 and their movement between the first state and the second state upon switching of the gripper 300 between the closed stable state and the open stable state, and that other configurations of the elastic connectors 370 may be used in other embodiments.

The motor-driven lever mechanism 380 (which also may be referred to as a "release mechanism" or an "opening mechanism") may be configured for switching the bistable gripper 300 from the closed stable state to the open stable state. As shown, the motor-driven lever mechanism 380 may include a lever 382, a motor 384, a cable 386, a motor mount 388, and a lever support 390. The lever 382 may be pivotably attached to the lever support 390 and configured for engaging the switching pad 350. In some embodiments, as shown, a first end portion of the lever 382 may be configured for engaging the bottom of the support 354. The lever 382 may be configured for pivoting about the joint from a first position, as shown in FIG. 3A, to a second position to cause the switching pad 350 to move from its first position to its second position and switch the gripper 300 from the closed stable state to the open stable state. Such pivoting of the lever 382 may be facilitated by the motor 384 and the cable 386. As shown, the motor 384 may include a rotatable shaft, and the cable 386 may be attached to the rotatable shaft and a second end portion of the lever 382. Upon activation of the motor 384, the rotatable shaft may rotate and cause the cable 386 to be wound around the shaft, thereby causing the lever 382 to pivot from its first position to its second position. After the gripper 300 has switched from the closed stable state to the open stable state, the cable 386 may be unwound from the rotatable shaft, for example, by rotating the shaft in the opposite direction. In this manner, the lever 382 may return to its first position and not impede movement of the switching pad 350 from its second position to its first position, thereby allowing subsequent switching of the gripper 300 from the open stable state to the closed stable state when desired. As shown, the motor 384 may be attached to and supported by the motor mount 388. In some embodiments, the motor 384 may be a DC motor, although other types of motors may be used. In some embodiments, the motor mount 388 and the lever support 390 may be integrally formed with the base 310. In other embodiments, the motor mount 388 and the lever support 390 may be separately formed and fixedly attached to the base 310.

As discussed above, the bistable gripper 300 may be configured to provide an asymmetric force-displacement relationship, such that the magnitude of a first activation force required to switch the gripper 300 from the closed stable state to the open stable state is different from the magnitude of a second activation force required to switch the gripper 300 from the open stable state to the closed stable state. In some embodiments, the magnitude of the first activation force may be greater than the magnitude of the second activation force. In this manner, the bistable gripper 300 may be easy to switch from the open stable state to the closed stable state for grasping a perching object and also may maintain a stable grasp of the perching object until release therefrom is desired. To facilitate easy switching of the gripper 300 from the open stable state to the closed stable state, the second activation force may be selected to be small enough to be exerted by an aerial vehicle to which the gripper 300 is mounted. To provide a stable grasp of the perching object, the first activation force may be selected to be large enough to hold the weight of the aerial vehicle and the gripper 300. Mathematical models and techniques for configuring the gripper 300 to provide desired activation forces are provided below.

Characteristics of the gripper 300 may be selected and adjusted to accommodate aerial vehicles of different sizes and weights while satisfying the objectives of providing ease of switching the gripper 300 from the open stable state to the closed stable state and a stable hold of objects grasped by the gripper 300. First, the elastic connectors 370, which serve as compliant joints, can generate an asymmetric force-displacement relationship. As discussed above, the elastic connectors 370 may assume a natural state when the gripper 300 is in the closed stable state and a deformed state when the gripper 300 is in the open stable state. For example, the elastic connectors 370 may have a linear shape when in the natural state and a bent shape when in the deformed state. In this manner, the elastic connectors 370 may store strain energy when the gripper 300 is in the open stable state and release the stored strain energy when the gripper 300 is switched from the open stable state to the closed stable state, thereby requiring a smaller second activation force for switching the gripper 300 from the open stable state to the closed stable state. Second, the orientations of the beams 312 of the base 310 can be used to affect the magnitudes of the first activation force and the second activation force. For example, the tilt angle of the beams 312 relative to the vertical direction may be selected to provide desired magnitudes of the first activation force and the second activation force, without changing the other components of the gripper 300. It will be appreciated that other changes to the components and/or features of the gripper 300 may be made to provide a desired asymmetric force-displacement relationship.

Figure 3H:
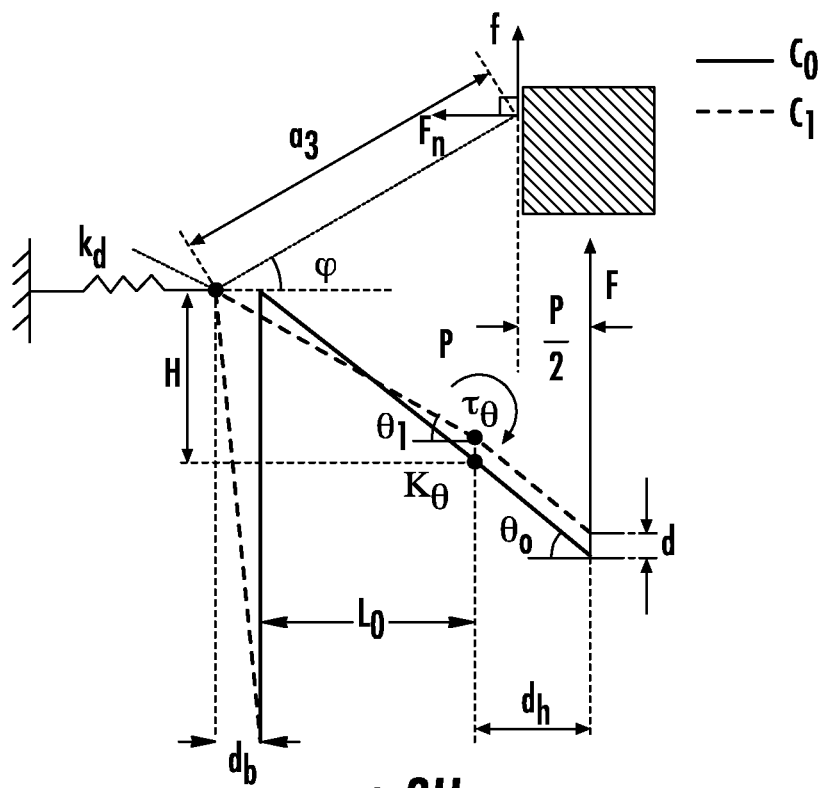
FIG. 3H is a schematic diagram illustrating a mathematical model for a portion of the gripper of FIG. 3A, showing the portion in the closed stable state and a state of transition.

For the bistable gripper 300, successful transitions between the closed stable state and the open stable state require application of the respective activation forces, which can be determined from the force-displacement relationship of the gripper 300. The activation forces will depend, at least in part, on certain parameters of the bistable gripper 300 described herein with reference to FIGS. 3G and 3H. FIG. 3G shows one branch of the gripper 300, including one of the beams 312, the transverse beam 314, one of the fingers 330, the switching pad 350, and one of the elastic connectors 370. The left side of FIG. 3G illustrates the branch in an example closed stable state, while the right side of FIG. 3G illustrates the branch in an example open stable state. Because the motor-driven lever mechanism 380 does not influence the force-displacement characteristics, it is not included in FIG. 3G. FIG. 3H illustrates a mathematical model for the branch of the gripper 300, showing the branch in the closed stable state and a state of transition after application of a force moving the branch from the closed stable state.

As shown in FIG. 3G, $l_h$ is the distance from the free end of the arm 356 of the switching pad 350 to the centerline of switching pad 350, h is the length of the elastic connector 370, $l_f$ is the distance from the center of joint to the free end of the lower finger portion 332 of the finger 330, $a_2$ is the length of the upper finger portion 334 of the finger 330, and $a_1$ is the length from the centerline of the upper finger portion 334 to the center of the joint. The angle between the upper finger portion 334 and the lower finger portion 332 is $\alpha$. The distance from the joint to the fixed end of the beam 312 (i.e., the intersection between the beam 312 and the transverse beam 314) is $l_b$. The angle between the arm 356 of the switching pad 350 and the horizontal direction is $\theta_0$. The height of the transverse beam 314 is $h_b$. As discussed above, the bistability of the gripper 300 is generated by the deformation of the elastic connector 370 and the beams 312. Therefore, the statics for the gripper 300 are modeled by considering these two components. The elastic connector 370 is modeled with the pseudo-rigid-body model (see Howell, L. L., et al.), a widely used technique for compliant systems. Specifically, the elastic connector 370 may be modeled as two rigid links connected by a rotational joint. It will be appreciated that more complicated models with more joints may be used (see DeMario, A. et al., "Development and analysis of a three-dimensional printed miniature walking robot with soft joints and links," *Journal of Mechanisms and Robotics*," vol. 10, 04, 2018), but the selected model may be used for simplicity. To represent the elastic connector's resistance to bending, a torsional spring associated with the joint may be assumed. The joint is located at $yl_t$ away from the end connected with the finger 330, where $l_t$ is the length of the elastic connector 370. Detailed $\gamma$ values can be found in Howell, L. L., et al. For purposes of modeling the elastic connector 370, $\gamma=0.85$ may be used because it is the average value that will generate the most accurate approximation when the direction of the applied force at the end of a compliant joint is in a large range (see Howell, L. L., et al.). The spring constant for the torsional spring is $k_\theta=\pi\gamma^2 E_{y,t} I_t/l_t$, where $E_{y,t}$ and $I_t$ are the Young's modulus and second moment of inertia of the elastic connector 370, respectively. The beam 312 may be modeled as a linear spring which can only be compressed in the horizontal direction, because its outward displacement is small. The spring constant for the linear spring is $k_d=3E_{y,b}I_b/l_b^3$, where $E_{y,b}$ and $I_b$ are the Young's modulus and second moment of inertia of the beam 312, respectively. For purposes of the model, the change of $l_b$ in the vertical direction may be ignored because the change is small.

With the above models for elastic connectors 370 and the beams 312, the model of FIG. 3H can be created for mathematical derivation. FIG. 3H shows respective lines for an initial closed configuration $C_0$ (i.e., the closed stable state) a configuration during state transition $C_1$ for the gripper 300. Due to the symmetry of the gripper 300, the switching pad 350 at the centerline can only move in the vertical direction with displacement d.

Because the applied force F is the only input and the switching process is quasi-static, the force-displacement characteristics between the force F and the displacement d can be derived from the total strain energy E in the linear springs for the beams 312 and the torsional springs for the elastic connectors 370 through the following equation (see Chen, T. et al.):

$$F = \frac{\partial E}{\partial d}$$

From the assumptions about linear and torsional springs, the strain energy in the two beams 312 can be written as:

$$E_b = k_d d_b^2$$

where $d_b$ is the horizontal displacement of the linear spring. This equation can be solved from the following geometrical relationship:

$$H^2 + L_0^2 = (H-d)^2 + (L_0 + d_b)^2$$

where L0 and H are constants defined as:

$$L_0 = (l_f + \gamma l_t) \cos \theta_0, \; H = (l_f + \gamma l_t) \sin \theta_0$$

With this equation, $d_b$ can be solved as a function of d:

$$d_b = \sqrt{2Hd + L_0^2 - d^2} - L_0.$$

The strain energy in the two elastic connectors 370 can be written as:

$$E_t = k_\theta (\theta_1 - \theta_0)^2$$

where $\theta_1$ is the angle between the lower finger portion 332 and the horizontal axis at the configuration $C_1$, which can also be represented as a function of d:

$$\theta_1 = \arctan(H-d)/(L_0 + d_b).$$

Therefore, the total strain energy E is:

$$E = E_t + E_b = k_\theta(\theta_1 - \theta_0)^2 + k_d d_b^2$$

Plugging the energy into the first equation above, the force-displacement characteristics can be obtained as:

$$F(d) = -\frac{2}{L_0 + d_b}[-k_d d_b (H-d) + k_\theta(\theta_1 - \theta_0)]$$

As noted above, in some instances, the bistable gripper 300 may utilize a perching method referred to as "clipping," for which friction forces are utilized for perching. To ensure successful clipping, it is necessary to analyze the friction force generated by the two contact feet 340 for a perching object with a given size. The clipping scenario also is depicted in FIG. 3H, where a rectangular object is placed vertically with the contact feet 340 clipping on the object.

For modeling purposes, it may be assumed that the surface of the perching object is flat and in the vertical direction. When the gripper 300 is closed, the fingers 330 can provide force on the surfaces of the object. The friction force f resulting from the normal force $F_n$ will act on the contact point to support the aerial vehicle 302. In FIG. 3H, $a_3$ is the distance from the center of the joint between the beam 312 and the finger 330 to the contact point, and $\varphi$ is the angle between the horizontal direction and $a_3$. $a_3$ can be solved based on the geometric relationship shown in FIG. 3G:

$$a_3 = \sqrt{a_1^2 + a_2^2 - 2a_1 a_2 \cos\alpha}$$

$\varphi$ can be solved similarly based on the geometric relationship shown in FIG. 3H:

$$\varphi = \pi - \arccos\frac{a_1^2 + a_3^2 - a_2^2}{2a_1 a_3} - \theta_1$$

For a given design of the bistable gripper 300, the size of the perching object can determine whether the perching is successful or not. Therefore, a range of sizes for the object that will allow for successful perching must be determined. To do this, the vertical displacement d for the switching pad given the object's size P may be derived. Then, the normal force $F_n$ may be obtained from d. Finally, successful perching can be determined by checking if $\mu F_n \geq f = mg/2$, where $\mu$ is the friction coefficient.

The relationship between the object size P and the displacement d can be obtained from the geometrical relationship:

$$P = 2(d_b + L_0 + d_h - a_3 \cos\varphi)$$

where $d_h = [(1-\gamma)l_t + l_h] \cos\theta_0$. From this equation, displacement d can be numerically solved given P because $d_b$ and $\varphi$ are functions of d. To obtain the normal force $F_n$ from d, the statics can be analyzed using a free body diagram for the fingers 330 of the gripper 300. As shown in FIG. 3H, there are four torques acting on the finger: recovering torque from the elastic connector 370 in the clockwise direction $\tau_\Theta$, torque generated by $F_d$ from the linear spring acting on elastic connector pivot $\tau_{k_d}$ in the clockwise direction, torque generated from $F_n$ in the counter-clockwise direction $\tau_{F_n}$, and torque generated by f in the counter-clockwise direction $\tau_f$. If it is assumed that the aerial vehicle 302 is able to perch on the object, thus f=mg/2. Then, the torque equilibrium equation is:

$$\tau_{F_n} + \tau_f = \tau_\Theta + \tau_{k_d}$$

By solving this equation, the normal force $F_n$ can be obtained as a function of d:

$$F_n(d) = \frac{k_d d_b (H - d) + k_\theta(\theta_0 - \theta_1) - mg(d_h - P/2)/2}{a_3 \sin\varphi + H - d}$$

With the $F_n(d)$ equation, a determination as to whether clipping perching will be successful can be made by checking if $\mu F_n \geq f = mg/2$.

If the parameters in the force-displacement characteristics equation are not chosen appropriately, the gripper mechanism may become monostable, in which case it only has one stable state. To provide design guidelines to generate the bistability required for perching, the influence of two important design parameters on the bistability of the gripper mechanism was investigated.

Figure 3I:
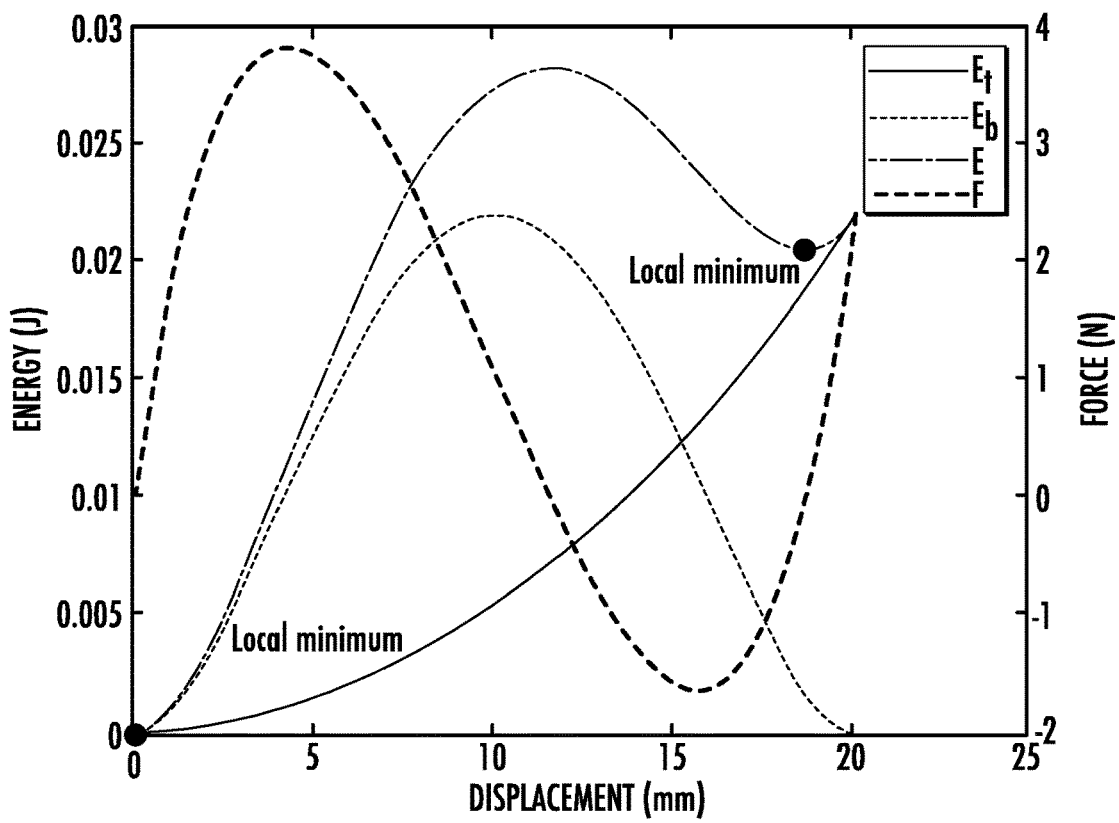
FIG. 3I is a line graph of potential energy and force as a function of displacement, illustrating potential energy for one of the elastic connectors, potential energy for one of the beams, and total potential energy for a bistable configuration of the gripper of FIG. 3A.
Figure 3J:
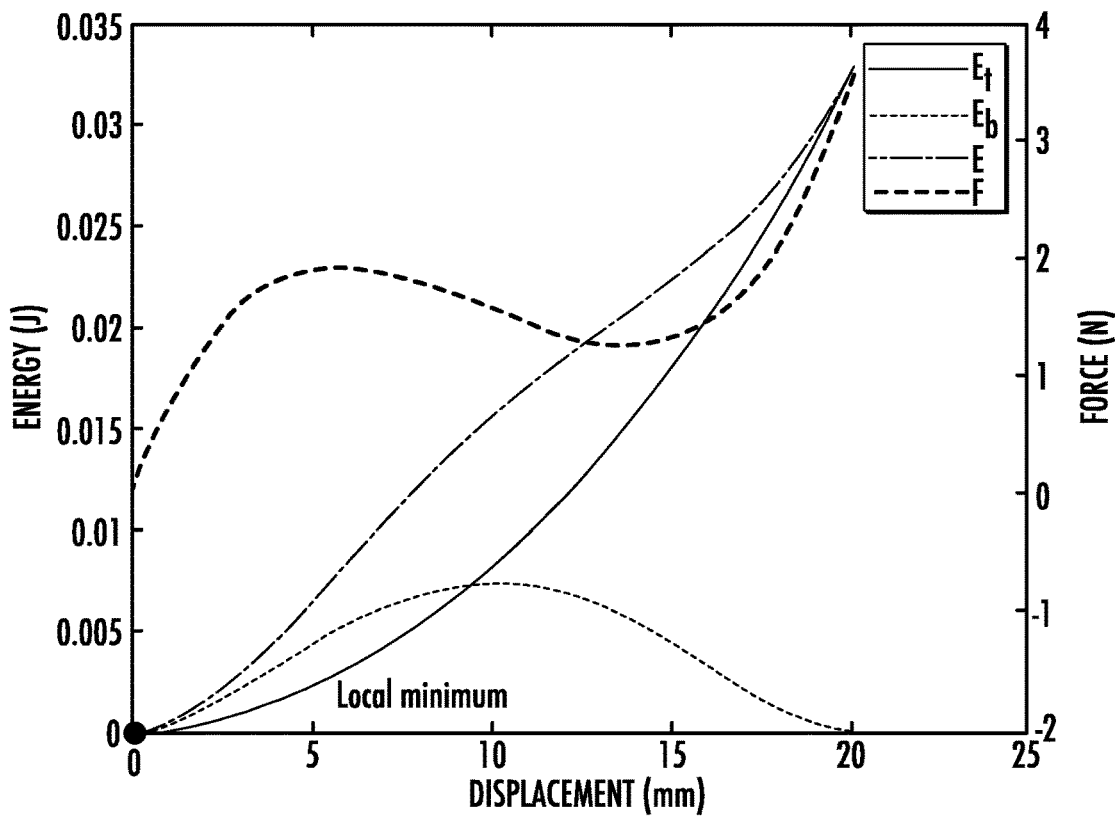
FIG. 3J is a line graph of potential energy and force as a function of displacement, illustrating potential energy for one of the elastic connectors, potential energy for one of the beams, and total potential energy for a monostable configuration of the gripper of FIG. 3A.

First, the reason for bistability was qualitatively investigated using simulations. The bistability of the gripper 300 is generated by the competition of potential energy from the elastic connectors 370 ($E_t$) and the beams 312 ($E_b$). FIG. 3I shows $E_t$, $E_b$, and total energy E for a bistable configuration, while FIG. 3J shows $E_t$, $E_b$, and total energy E for a monostable configuration. As shown, $E_t$ will monotonically increase because the elastic connector 370 will increasingly bend as the displacement increases. In contrast, $E_b$ will first increase and then decrease because $d_b$ (FIG. 3H) will first increase and then decrease. Combining $E_t$ and $E_b$, the total energy $E = E_t + E_b$ can have either a single minimum at the initial configuration, as shown in FIG. 3J (d=0), or two minima, as shown in FIG. 3I, with different choices of $k_d$ and $k_\theta$. It should be noted that different values of Ica can be realized by choosing different thickness for the beam 312, while different values of Ice can be achieved using elastic connectors 370 made from different materials.

In addition to the potential energy, a determination as to the bistable or monostable nature of the gripper mechanism also can be made from the force-displacement characteristics. In the quasi-static state transition case, the force-displacement in the force-displacement characteristics equation is the first-order derivative of the potential energy, which can tell the direction of the potential energy curve. If the force is always positive, the energy will be monotonically increasing as in the monostable case (FIG. 3J). If the initial positive force becomes negative at some displacement d, the potential energy will decrease and have a local minimum as in the bistable case (FIG. 3I). In other words, the system is bistable if there exists negative force in the force-displacement characteristics equation, and monostable if $F \geq 0$ for all displacement d values.

With the observations for the force, a bistability index BI may be defined to numerically investigate how $k_d$ and $k_\theta$ will influence the bistability:

$$BI = -\frac{F_{min}}{F_{max}}$$

where $F_{min}$ is the minimum force and $F_{max}$ is the maximum force in the force-displacement characteristics of the bistable mechanism. For the gripper 300, $0 \leq BI \leq 1$. BI=0 for all monostable mechanisms because $F_{min}=0$ at the initial configuration. $BI \leq 1$ means that the magnitude of $F_{min}$ is less than or equal to $F_{max}$. This can be explained by looking at the slope of the energy curve. Because the decreasing of energy is only generated by $E_b$, the negative slope cannot be larger than the positive slope. The extreme case where BI=1 happens when $k_\theta = 0$, which means the elastic connector 370 is a traditional rotational joint without any torsional stiffness. In that case, the force will be symmetrical with respect to d, similar to the von Mises truss.

Figure 3K:
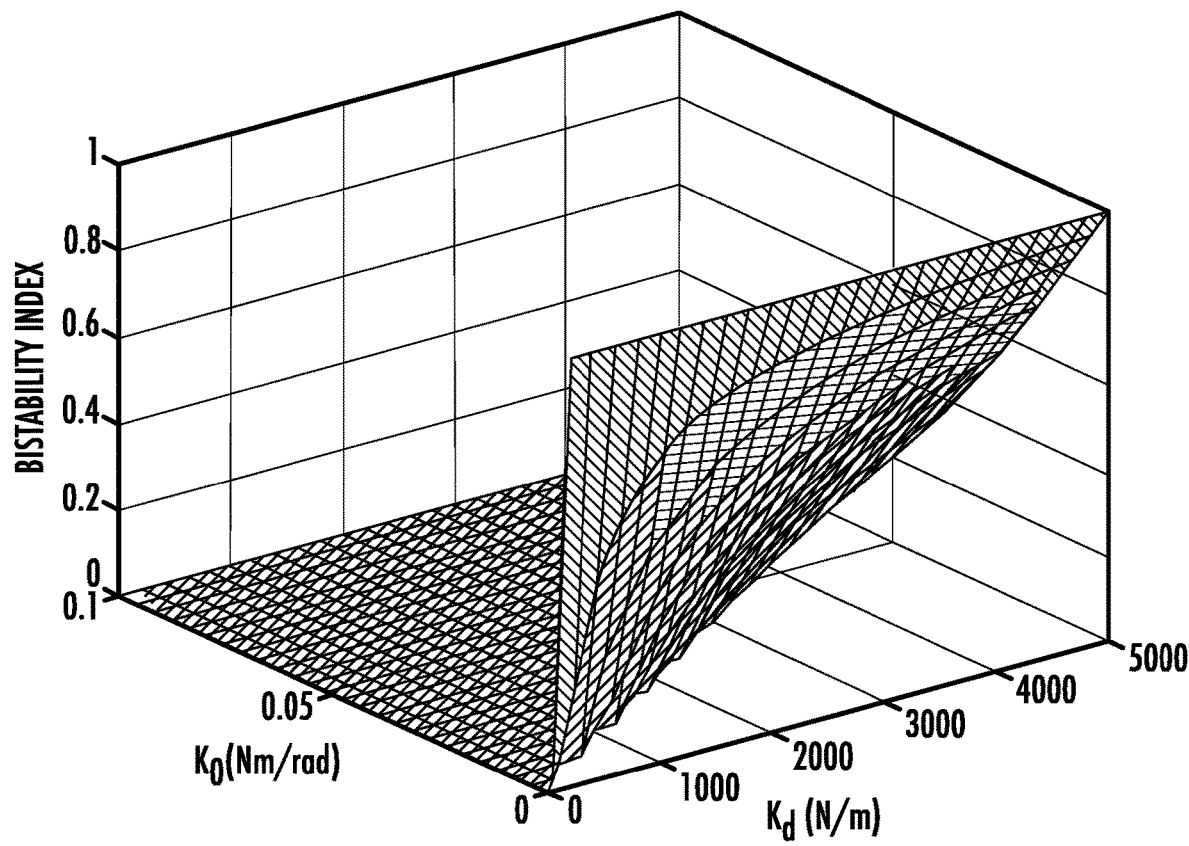
FIG. 3K is a three-dimensional surface graph of a bistability index as a function of a spring constant associated with one of the elastic connectors and a spring constant associated with one of the beams of the gripper of FIG. 3A.

To systematically explore how $k_d$ and $k_\theta$ influence the bistability, the BI may be plotted with respect to $k_d$ and $k_\theta$, as shown in FIG. 3K. The simulation uses $k_d \in [0, 5000]$ with a step size of 50 N/m and $k_\theta \in [0, 0.1]$ with a step size of 0.001 Nm/rad. The plot indicates that a larger $k_d$ will increase the bistability index because $E_b$ will dominate $E_t$, making the shape of the total energy closer to $E_b$ with two minima (FIG. 3I). Larger $k_\theta$ will decrease the bistability index, because $E_t$ will dominate $E_b$, making the shape of the total energy closer to $E_d$ with a single minimum.

The following describes example fabrication of the bistable gripper 300, experimental testing of the force-displacement characteristics, and comparison of the experimental data with the theoretical results. Verification of the object sizes for successful perching using the clipping method also was studied, along with perching experiments leveraging both the encircling and clipping methods using different objects in controlled and uncontrolled environments.

The bistable gripper 300 was fabricated by 3D-printing most of the components of the gripper 300 and then assembling them. In particular, the base 310 with the two beams 312 and the motor enclosure 388, the two fingers 330, the switching pad 350, the rigid base portions 342 of two contact feet 340, and the lever 382 were 3D-printed using veroclear material with an OBJET printer (OBJET30 PRO, by STRATASYS). The fingers 330 were connected to the switching pad 350 with the two elastic connectors 370 formed as tubes having an inner diameter of 1.5875 mm and an outer diameter of 6.35 mm (ULTRA-C-062-3, by SAIN-TECH). The elastomeric portions 344 of the contact feet 340 were fabricated from curable elastomers (Ecoflex30, Smooth-On) and attached to the rigid base portions 342. The motor 384 was provided as a DC motor (GH6124s, GIZ-MOSZONE) that weighs less than 1.5 g and can provide 200 gcm torque. A motor driver (DRV8838, POLOLU) was used, which can provide a continuous current of 1.7 A with less than 1 g weight. The detailed design parameters for the fabricated gripper 300 are shown in Table 3. The parameters were chosen to make the gripper 300 easy to close but stable to hold. With the design parameters, the theoretical switching forces for two directions were $F_{max}$=2.16 N (opening activation force) and $F_{min}$=−0.43 N (closing activation force), respectively. The gripper 300 weighed about 8 g, including the motor driver. The gripper 300 was attached to the CRAZYFLIE aerial vehicle (CRAZYFLIE 2.0, BIT-CRAZE) using a zip tie, as shown in FIG. 3D. The whole system, referred to as "Perchflie," was about 40 g, including a flow deck on the bottom for stable motion control.

TABLE 3

| $\alpha_1$ (mm) | $\alpha_2$ (mm) | $\alpha$ (°) | $\theta_0$ (°) | $h_b$ (mm) |
|---|---|---|---|---|
| 9 | 37.8 | 60 | 30 | 6.5 |
| $l_b$ (mm) | $l_f$ (mm) | $l_t$ (mm) | $l_h$ (mm) | |
| 20.5 | 15 | 6 | 8.81 | |

As discussed above, the lever 382 was pivotably connected to the lever support 390 with a pin shaft. The total length of the lever 382 was about 52 mm, of which each of the pushing side and the dragging side was about 26 mm. With such dimensions, the force and travel distance were the same for both sides. The cable 386 was provided as a string coiled on the shaft of the motor 384 and tied to the dragging side of the lever 382. With this lever-motor system, a full opening procedure required about 2 s at the full motor speed.

Figure 3L:
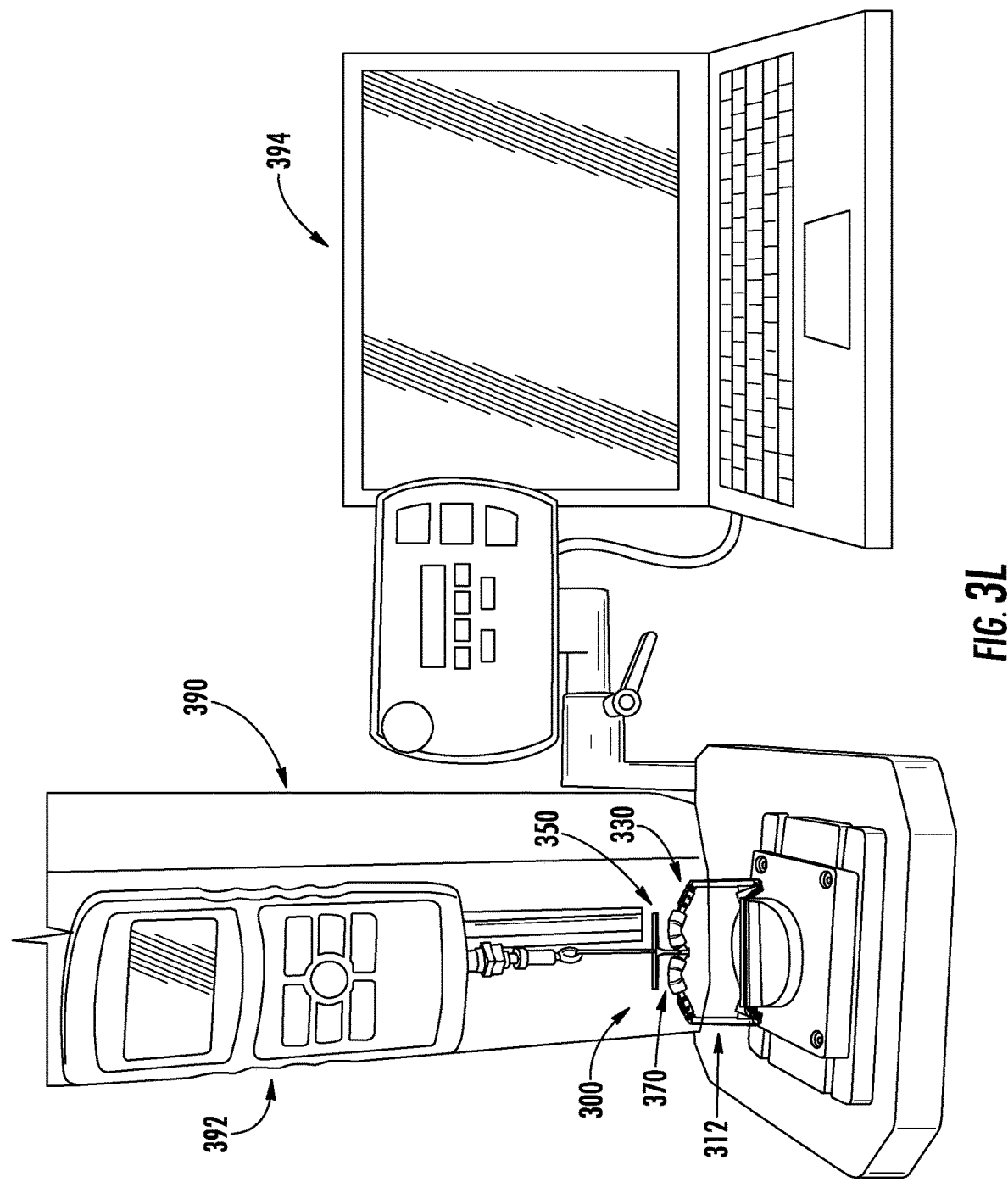
FIG. 3L is a perspective view of a test setup for determining activation forces for the gripper of FIG. 3A in accordance with one or more embodiments of the disclosure.

To verify the mathematical model that predicts the activation forces, experiments first were conducted to obtain the force-displacement characteristics. FIG. 3L shows the experimental setup used. The main test machine was a motorized tension/compression test stand 390 (ESM303, MARK-10). With a force gauge 392 (M5-2, MARK-10) connected, the stand 390 can move with a constant speed both upward and downward while measuring both tension and compression force. The measure range of the M5-2 was 10 N with a precision of 0.002 N. A software package (MESUR™ gauge Plus, MARK-10) operating on a computing device 394 was used for recording the force and displacement data.

Figure 3M:
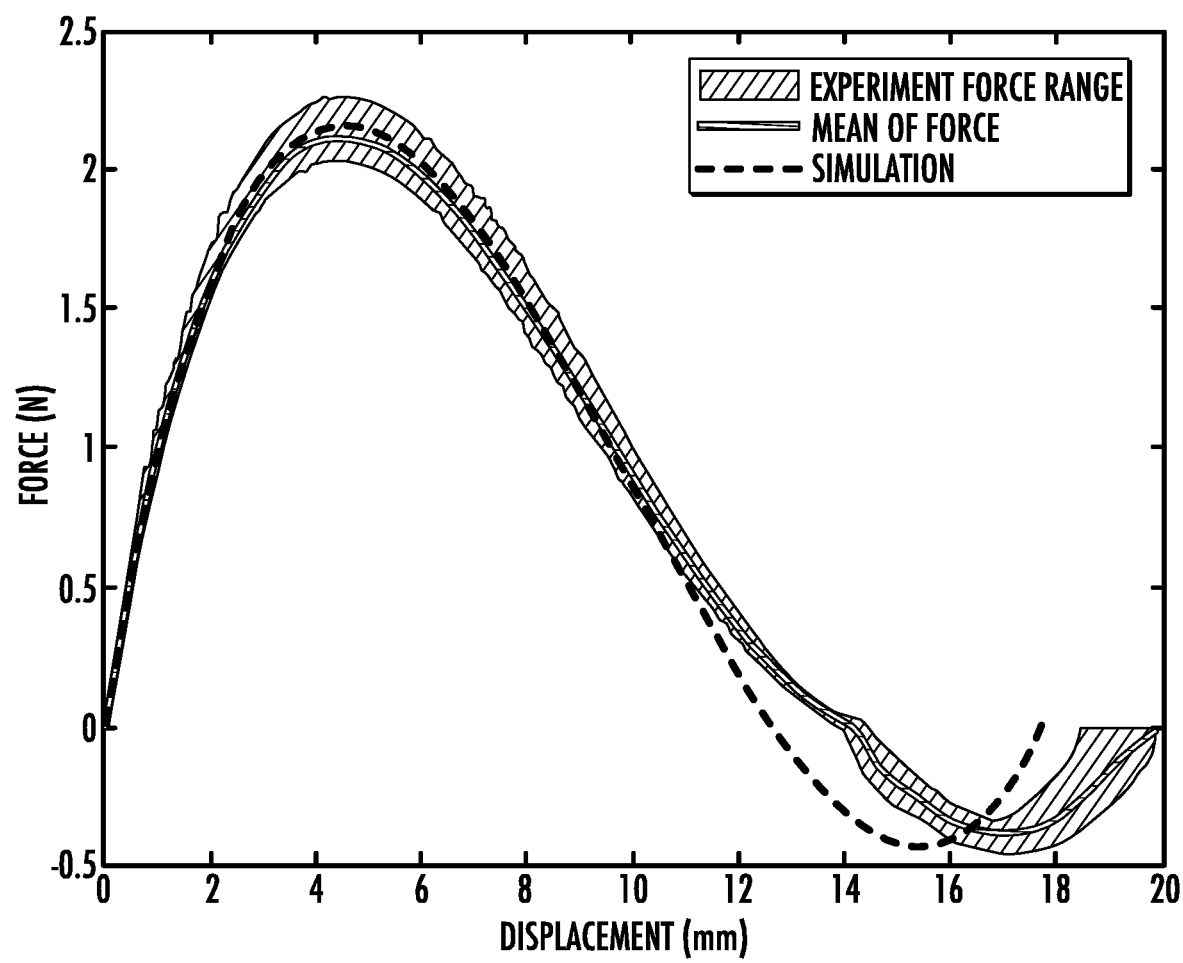
FIG. 3M is a line graph of force as a function of displacement, illustrating experimental and simulated force-displacement characteristics of the gripper of FIG. 3A.

The experiments were separated into two parts to minimize possible hysteresis: (1) dragging for the opening force, and (2) pushing for the closing force. In the dragging experiment, the gripper 300 started in the closed stable state and ended at 0 N when no external force was needed to switch it to the open stable state. The switching pad 350 was connected to the force gauge 392 through a string. While the switching pad 350 was dragged to move upward with a constant speed, the software recorded the displacement and force data. For the pushing experiment, the gripper 300 started in the open stable state and ended at 0 N when no external force was needed to switch it to the closed stable state. During the experiments, the force gauge 392 moved downward to push the switching pad 350. Ten pushing and ten dragging experiments were carried out, and the individual pushing and dragging experimental data was combined to generate a whole force-displacement characteristics figure. FIG. 3M shows the experimental results. The shaded area shows the distribution of the experimental results. The dashed line shows the theoretical results, while the solid line shows the mean value of the ten combined experimental results. To quantify the experimental results, there are several important parameters, i.e., maximum force $F_{max}$, minimum force $F_{min}$, maximum opening displacement do (displacement between the first two zero forces) and maximum closing displacement dc (displacement between the last two zero forces). Table 4 shows the mean of these four parameters in the ten experiments together with the theoretical values from the simulation.

TABLE 4

| | $F_{max}$ (N) | $F_{min}$ (N) | $d_o$ (mm) | $d_c$ (mm) |
|---|---|---|---|---|
| Simulation | 2.16 | −0.43 | 12.66 | 5.07 |
| Experiment | 2.12 | −0.39 | 14.17 | 5.23 |
| Error (%) | 2.1 | 8.6 | 11.93 | 3.2 |

Figure 3N:
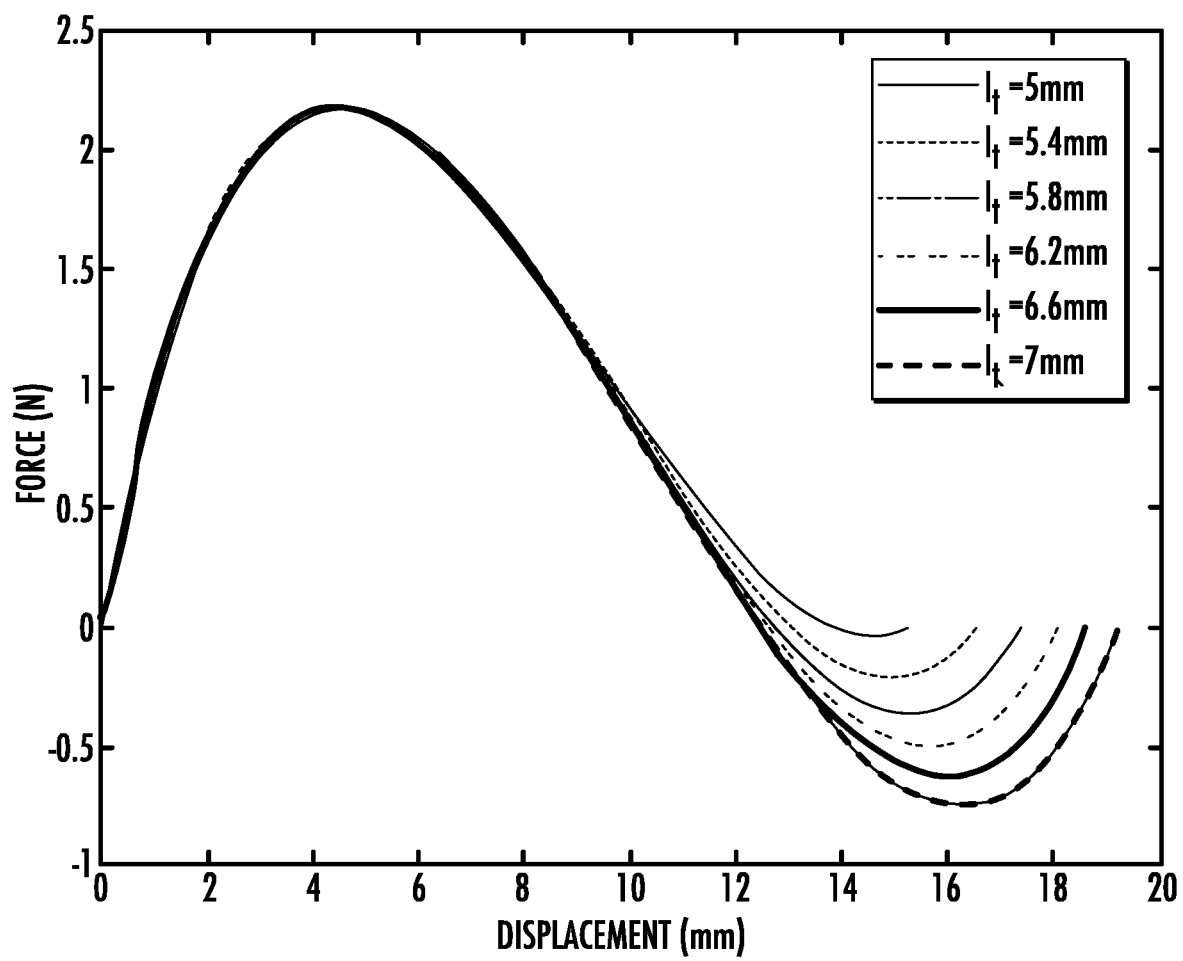
FIG. 3N is a line graph of force as a function of displacement, illustrating simulated force-displacement characteristics of the gripper of FIG. 3A for different lengths of the elastic connectors.

The data of FIG. 3M and Table 4 indicate that the experimental results are reasonably accurate. The error mainly comes from the simplified models. First, the beams 312 were modeled as linear springs and the elastic connectors 370 were modeled as torsional springs, but they may not exactly follow the spring laws. Second, the fabrication and assembly process may have introduced some errors for the exact dimensions for each of the components. As shown in FIG. 3M, the error increases when the opening force is decreasing for the opening experiment. The largest error (11.93%) occurs with the maximum opening displacement. The reason is that the elastic connectors 370 are compressed because they are horizontal to the base 310. This period corresponds to the lagging part of the experimental results. The compression will result in smaller it, which will increase the bending stiffness $K_\theta$ based on the pseudo-rigid-body model. As analyzed above, a larger value of $K_\theta$ will increase BI and make the system less bistable. This will make the force-displacement characteristics decrease more slowly. To better illustrate this phenomenon, several cases were simulated with six different lengths (5 mm to 7 mm with a step size of 0.4 mm) of the elastic connectors, and the force-displacement characteristics were plotted to compare the difference (FIG. 3N). The simulation results show that the force-displacement characteristics are almost the same before 9 mm of displacement. After 9 mm of displacement, grippers with longer elastic connectors 370 tend to have a larger force to make the system more bistable. As a result, the force profiles for grippers with shorter elastic connectors 370 decrease slower than the longer ones, which explains the lagging of the experimental results.

As the gripper 300 can generate different normal forces $F_n$ and friction forces f on different sized objects, the prediction for successful perching on objects with different sizes was experimentally tested. 3D-printed objects made from Polylactic Acid (PLA) with different sizes were used as perching objects. First, the friction coefficient μ between ecoflex 30 and 3D-printed PLA was experimentally tested. Because ecoflex 30 is soft, the friction coefficient between it and PLA was not constant. The experimental data indicated that the friction coefficient varied with normal force. In this experiment, a container with a mass of 3.08 g was designed. Then, different weights from 0 g to 65 g were added with a step size of 5 g, and the test stand was used to horizontally drag the ecoflex 30 on 3D-printed PLA surface. The maximum friction force before relative motion occurred was recorded to calculate After six consistent tests, it was determined that a minimum of 5th order polynomial can fit the result well:

$$\mu = -52F_n^5 + 107F_n^4 - 80F_n^3 + 27F_n^2 - 4F_n + 1$$

Using this equation and the normal force equation discussed above, the range for the size of the PLA objects that will allow for successful perching was determined. Specifically, it was determined that the perching object should have a width from 3.7 mm to 36.4 mm. To verify the prediction, several PLA cubes were printed with eight different sizes for boundary cases: 3 mm, 4 mm, 5 mm, 6 mm, 33 mm, 34 mm, 35 mm, and 36 mm. The gripper 300 was manually manipulated to clip onto the cubes and observed to see whether it would maintain grasp of the cube or not. The results showed that the gripper 300 can perch on such cubes with sizes of 5 mm, 6 mm, and 33 mm, which is a bit smaller than the estimation range. This error might be caused by the friction coefficient estimation.

After verifying the models, various perching experiments were conducted for Perchflie in controlled or uncontrolled environments. For encircling perching, as long as the dimension of the perching object was smaller than the space formed by the fingers 330 and switching pad 350 when the gripper 300 is in the closed stable state, the Perchflie can successfully perch on it. For tall objects, the gripper 300 can use the clipping method to clip on the objects to hold the Perchflie with enough friction forces.

The perching experiments were conducted on three different objects with the two perching methods: encircling and clipping. The clipping perching was conducted on two objects with different materials: (1) a vertically placed cardboard with a width of 7 mm, and (2) a cuboid of wood with a width of 17 mm. The encircling perching was conducted on a cuboid wood with a width of 31 mm and a height of 5 mm. In each experiment, the Perchflie was manually controlled to take off and accelerate to the perching object. With an impact force acting on the switching pad 350, the gripper 300 would close to perch using either clipping or encircling method. After perching, the motor 384 was controlled to open the gripper 300. After detachment, the Perchflie hovered immediately. The motor 384 continued rotation of its shaft to fully open the gripper 300 while hovering. After the gripper 300 was fully opened, the motor 384 would rotate the shaft in the opposite direction to move the lever 382 away from the switching pad 350 for the next perching event. After unwinding the cable 386, the motor 384 would stop, and the Perchflie could perch again.

In addition to the artificially controlled perching experiments, two perching experiments in uncontrolled environments also were conducted. The first perching experiment was conducted on a plastic pipe. The Perchflie was manually controlled to perch on the pipe using the encircling method. The second perching experiment was conducted with a vertically placed poster board using the clipping method. In both experiments, the Perchflie was able to successfully perch, release, and hover.

Although specific embodiments of the disclosure have been described, one of ordinary skill in the art will recognize that numerous other modifications and alternative embodiments are within the scope of the disclosure. Further, while various illustrative implementations and architectures have been described in accordance with embodiments of the disclosure, one of ordinary skill in the art will appreciate that numerous other modifications to the illustrative implementations and architectures described herein are also within the scope of this disclosure.

Although embodiments have been described in language specific to structural features and/or methodological acts, it is to be understood that the disclosure is not necessarily limited to the specific features or acts described. Rather, the specific features and acts are disclosed as illustrative forms of implementing the embodiments. Conditional language, such as, among others, "can," "could," "might," or "may," unless specifically stated otherwise, or otherwise understood within the context as used, is generally intended to convey that certain embodiments could include, while other embodiments do not include, certain features, elements, and/or steps. Thus, such conditional language is not generally intended to imply that features, elements, and/or steps are in any way required for one or more embodiments.

What is claimed is:

1. A bistable gripper for an aerial vehicle, the bistable gripper comprising:
   a base comprising a first beam and a second beam;
   a first finger pivotably attached to the first beam at a first joint;
   a second finger pivotably attached to the second beam at a second joint;
   a switching pad configured for moving relative to the base;
   a first elastic connector attached to the switching pad and the first finger; and
   a second elastic connector attached to the switching pad and the second finger;
   wherein the bistable gripper is configured for switching between a closed stable state and an open stable state.

2. The bistable gripper of claim 1, wherein the first beam and the second beam are configured for storing strain energy when the bistable gripper is in the open stable state, and wherein the first beam and the second beam are configured for releasing the stored strain energy when the bistable gripper is switched from the open stable state to the closed stable state.

3. The bistable gripper of claim 1, wherein the first beam and the second beam are configured for elastically deforming when the bistable gripper is switched from the closed stable state to the open stable state.

4. The bistable gripper of claim 3, wherein the first beam is configured for elastically deforming from a first natural state to a first deformed state when the bistable gripper is switched from the closed stable state to the open stable state, wherein the first beam is configured for returning from the first deformed state to the first natural state when the bistable gripper is switched from the open stable state to the closed stable state, wherein the second beam is configured for elastically deforming from a second natural state to a second deformed state when the bistable gripper is switched from the closed stable state to the open stable state, and wherein the second beam is configured for returning from the second deformed state to the second natural state when the bistable gripper is switched from the open stable state to the closed stable state.

5. The bistable gripper of claim 1, wherein the base further comprises a transverse beam extending between the first beam and the second beam, and wherein the first beam, the second beam, and the transverse beam are integrally formed with one another.

6. The bistable gripper of claim 1, wherein the first finger comprises a first lower finger portion and a first upper finger portion fixedly attached to one another, and wherein the second finger comprises a second lower finger portion and a second upper finger portion fixedly attached to one another.

7. The bistable gripper of claim 6, wherein the first lower finger portion and the first upper finger portion are angled relative to one another to define a first acute angle therebetween, and wherein the second lower finger portion and the second upper finger portion are angled relative to one another to define a second acute angle therebetween.

8. The bistable gripper of claim 6, wherein the first lower finger portion is pivotably attached to the first beam at the first joint, and wherein the second lower finger portion is pivotably attached to the second beam at the second joint.

9. The bistable gripper of claim 6, wherein the first finger is configured for pivoting about the first joint from a first closed position to a first open position when the bistable gripper is switched from the closed stable state to the open stable state, wherein the first finger is configured for pivoting about the first joint from the first open position to the first closed position when the bistable gripper is switched from the open stable state to the closed stable state, wherein the second finger is configured for pivoting about the second joint from a second closed position to a second open position when the bistable gripper is switched from the closed stable state to the open stable state, and wherein the second finger is configured for pivoting about the second joint from the second open position to the second closed position when the bistable gripper is switched from the open stable state to the closed stable state.

10. The bistable gripper of claim 6, wherein the first finger and the second finger are configured for pivoting such that the first upper finger portion and the second upper finger portion move away from one another when the bistable gripper is switched from the closed stable state to the open stable state and such that the first upper finger portion and the second upper finger portion move toward one another when the bistable gripper is switched from the open stable state to the closed stable state.

11. The bistable gripper of claim 6, further comprising:
a first foot pivotably attached to the first upper finger portion, wherein the first foot comprises a first rigid base portion and a first elastomeric portion attached to the first rigid base portion; and
a second foot pivotably attached to the second upper finger portion, wherein the second foot comprises a second rigid base portion and a second elastomeric portion attached to the second rigid base portion.

12. The bistable gripper of claim 1, wherein the switching pad is configured for translating in a first direction from a first position to a second position when the bistable gripper is switched from the closed stable state to the open stable state, and wherein the switching pad is configured for translating in an opposite second direction from the second position to the first position when the bistable gripper is switched from the open stable state to the closed stable state.

13. The bistable gripper of claim 12, wherein the bistable gripper is configured for switching from the closed stable state to the open stable state upon application of a first force to the switching pad in the first direction, wherein the bistable gripper is configured for switching from the open stable state to the closed stable state upon application of a second force to the switching pad in the second direction, and wherein the first force is greater than the second force.

14. The bistable gripper of claim 13, further comprising a motor-driven lever mechanism configured for applying the first force to the switching pad, wherein the motor-driven lever mechanism comprises:
a motor comprising a rotatable shaft;
a lever configured for engaging the switching pad; and
a cable attached to the rotatable shaft and the lever.

15. The bistable gripper of claim 1, wherein the first elastic connector and the second elastic connector are configured for storing strain energy when the bistable gripper is in the open stable state, and wherein the first elastic connector and the second elastic connector are configured for releasing the stored strain energy when the bistable gripper is switched from the open stable state to the closed stable state.

16. The bistable gripper of claim 1, wherein the first elastic connector and the second elastic connector are configured for elastically deforming when the bistable gripper is switched from the closed stable state to the open stable state.

17. The bistable gripper of claim 16, wherein the first elastic connector is configured for elastically deforming from a first natural state to a first deformed state when the bistable gripper is switched from the closed stable state to the open stable state, wherein the first elastic connector is configured for returning from the first deformed state to the first natural state when the bistable gripper is switched from the open stable state to the closed stable state, wherein the second elastic connector is configured for elastically deforming from a second natural state to a second deformed state when the bistable gripper is switched from the closed stable state to the open stable state, and wherein the second elastic connector is configured for returning from the second deformed state to the second natural state when the bistable gripper is switched from the open stable state to the closed stable state.

18. The bistable gripper of claim 1, wherein the first elastic connector comprises a first tube, and wherein the second elastic connector comprises a second tube.

19. A bistable gripper for an aerial vehicle, the bistable gripper comprising:
a base;
a first finger pivotably attached to the base at a first joint;
a second finger pivotably attached to the base at a second joint;
a switching pad configured for moving relative to the base;
a first elastic connector attached to the switching pad and the first finger; and
a second elastic connector attached to the switching pad and the second finger;
wherein the bistable gripper is configured for switching between a closed stable state and an open stable state, wherein the first elastic connector and the second elastic connector are configured for storing strain energy when the bistable gripper is in the open stable state, and wherein the first elastic connector and the second elastic connector are configured for releasing the stored strain energy when the bistable gripper is switched from the open stable state to the closed stable state.

20. A bistable gripper for an aerial vehicle, the bistable gripper comprising:
 a base comprising a first beam and a second beam;
 a first finger pivotably attached to the first beam at a first joint;
 a second finger pivotably attached to the second beam at a second joint;
 a switching pad configured for moving relative to the base;
 a first connector attached to the switching pad and the first finger; and
 a second connector attached to the switching pad and the second finger;
 wherein the bistable gripper is configured for switching between a closed stable state and an open stable state, wherein the first beam and the second beam are configured for storing strain energy when the bistable gripper is in the open stable state, and wherein the first beam and the second beam are configured for releasing the stored strain energy when the bistable gripper is switched from the open stable state to the closed stable state.

* * * * *